US008479247B2

(12) United States Patent
Shafer

(10) Patent No.: US 8,479,247 B2
(45) Date of Patent: *Jul. 2, 2013

(54) UPSTREAM BANDWIDTH CONDITIONING DEVICE

(75) Inventor: Steven K. Shafer, Chittenango, NY (US)

(73) Assignee: PPC Broadband, Inc., East Syracuse, NY (US)

( * ) Notice: Subject to any disclaimer, the term of this patent is extended or adjusted under 35 U.S.C. 154(b) by 228 days.

This patent is subject to a terminal disclaimer.

(21) Appl. No.: 12/760,153

(22) Filed: Apr. 14, 2010

(65) Prior Publication Data

US 2011/0258677 A1    Oct. 20, 2011

(51) Int. Cl.
*H04N 7/173* (2011.01)
*H04J 3/00* (2006.01)
*H04J 3/16* (2006.01)

(52) U.S. Cl.
USPC ........... 725/124; 725/105; 725/118; 725/119; 725/120; 725/125; 725/127; 370/464; 370/465; 370/498

(58) Field of Classification Search
USPC ........................................................ 725/124
See application file for complete search history.

(56) References Cited

U.S. PATENT DOCUMENTS

| | | | |
|---|---|---|---|
| 2,662,217 A | 12/1953 | Roberts | |
| 3,790,909 A | 2/1974 | Le Fevre | |
| 3,939,431 A | 2/1976 | Cohlman | |
| 4,027,219 A | 5/1977 | Van Alphen et al. | |
| 4,306,403 A | 12/1981 | Hubbard et al. | |
| 4,344,499 A | 8/1982 | Van der Lely et al. | |
| 4,418,424 A | 11/1983 | Kawamoto et al. | |
| 4,512,033 A | 4/1985 | Schrock | |
| 4,520,508 A | 5/1985 | Reichert, Jr. | |
| 4,521,920 A | 6/1985 | Forsberg et al. | |
| 4,648,123 A | 3/1987 | Schrock | |
| 4,677,390 A | 6/1987 | Wagner | |
| 4,715,012 A | 12/1987 | Mueller, Jr. | |
| 4,961,218 A | 10/1990 | Kiko | |
| 4,982,440 A | 1/1991 | Dufresne et al. | |
| 5,010,399 A | 4/1991 | Goodman et al. | |

(Continued)

FOREIGN PATENT DOCUMENTS

JP     55-080989 A     6/1980
JP     55-132126 A    10/1980

(Continued)

OTHER PUBLICATIONS

U.S. Appl. No. 13/245,510, filed Sep. 26, 2011, Wells.

(Continued)

*Primary Examiner* — Justin Shepard
(74) *Attorney, Agent, or Firm* — Schmeiser, Olsen & Watts LLP

(57) ABSTRACT

A device may be used for conditioning an upstream bandwidth. The device can include a return path extending at least a portion of a distance between a supplier side connector and a user side connector, and a coupler connected within the return path, the coupler providing a secondary path. An offset or noise detection circuit is connected electrically downstream the coupler. A microprocessor is connected to the detection circuit. A variable signal level adjustment device is connected within the return path. The variable signal level adjustment device can be controlled by the microprocessor responsive to a detected offset level or noise floor in the return path.

22 Claims, 17 Drawing Sheets

U.S. PATENT DOCUMENTS

| | | |
|---|---|---|
| 5,126,686 A | 6/1992 | Tam |
| 5,126,840 A | 6/1992 | Dufresne et al. |
| 5,214,505 A | 5/1993 | Rabowsky et al. |
| 5,231,660 A | 7/1993 | West, Jr. |
| 5,235,612 A | 8/1993 | Stilwell et al. |
| 5,245,300 A | 9/1993 | Sasaki et al. |
| 5,345,504 A | 9/1994 | West, Jr. |
| 5,361,394 A | 11/1994 | Shigihara |
| 5,369,642 A | 11/1994 | Shioka et al. |
| 5,389,882 A | 2/1995 | I'Anson et al. |
| 5,485,630 A | 1/1996 | Lee et al. |
| 5,548,255 A | 8/1996 | Spielman |
| 5,557,319 A | 9/1996 | Gurusami et al. |
| 5,557,510 A | 9/1996 | McIntyre et al. |
| 5,719,792 A | 2/1998 | Bush |
| 5,740,044 A | 4/1998 | Ehrenhardt et al. |
| 5,745,836 A | 4/1998 | Williams |
| 5,745,838 A | 4/1998 | Tresness et al. |
| 5,815,794 A | 9/1998 | Williams |
| 5,818,825 A * | 10/1998 | Corrigan et al. ............. 370/329 |
| 5,839,052 A | 11/1998 | Dean et al. |
| 5,893,024 A | 4/1999 | Sanders et al. |
| 5,937,330 A | 8/1999 | Vince et al. |
| 5,950,111 A | 9/1999 | Georger et al. |
| 5,956,075 A | 9/1999 | Matsuo |
| 5,970,053 A | 10/1999 | Schick et al. |
| 6,012,271 A | 1/2000 | Wilkens et al. |
| 6,014,547 A | 1/2000 | Caporizzo et al. |
| 6,049,693 A | 4/2000 | Baran et al. |
| 6,069,960 A | 5/2000 | Mizukami et al. |
| 6,094,211 A * | 7/2000 | Baran et al. .................... 725/125 |
| 6,101,932 A | 8/2000 | Wilkens |
| 6,128,040 A | 10/2000 | Shinbori et al. |
| 6,129,187 A | 10/2000 | Bellanger et al. |
| 6,160,990 A | 12/2000 | Kobayashi et al. |
| 6,173,225 B1 | 1/2001 | Stelzle et al. |
| 6,185,432 B1 | 2/2001 | Vembu |
| 6,205,138 B1 | 3/2001 | Nihal et al. |
| 6,229,375 B1 | 5/2001 | Koen |
| 6,253,077 B1 | 6/2001 | Burt et al. |
| 6,348,837 B1 | 2/2002 | Ibelings |
| 6,348,955 B1 | 2/2002 | Tait |
| 6,373,349 B2 | 4/2002 | Gilbert |
| 6,377,316 B1 | 4/2002 | Mycynek et al. |
| 6,388,539 B1 | 5/2002 | Rice |
| 6,425,132 B1 | 7/2002 | Chappell |
| 6,430,904 B1 | 8/2002 | Coers et al. |
| 6,495,998 B1 | 12/2002 | Terreault |
| 6,498,925 B1 | 12/2002 | Tauchi |
| 6,510,152 B1 | 1/2003 | Gerszberg et al. |
| 6,546,705 B2 | 4/2003 | Scarlett et al. |
| 6,550,063 B1 | 4/2003 | Matsuura |
| 6,560,778 B1 | 5/2003 | Hasegawa |
| 6,570,914 B1 | 5/2003 | Ichihara |
| 6,570,928 B1 | 5/2003 | Shibata |
| 6,587,012 B1 | 7/2003 | Farmer et al. |
| 6,622,304 B1 | 9/2003 | Carhart |
| 6,640,338 B1 | 10/2003 | Shibata |
| 6,678,893 B1 | 1/2004 | Jung |
| 6,683,513 B2 | 1/2004 | Shamsaifar et al. |
| 6,725,462 B1 | 4/2004 | Kaplan |
| 6,725,463 B1 | 4/2004 | Birleson |
| 6,728,968 B1 | 4/2004 | Abe et al. |
| 6,737,935 B1 | 5/2004 | Shafer |
| 6,757,910 B1 | 6/2004 | Bianu |
| 6,758,292 B2 | 7/2004 | Shoemaker |
| 6,804,828 B1 | 10/2004 | Shibata |
| 6,843,044 B2 | 1/2005 | Clauss |
| 6,845,232 B2 | 1/2005 | Darabi |
| 6,868,552 B1 | 3/2005 | Masuda et al. |
| 6,877,166 B1 | 4/2005 | Roeck et al. |
| 6,880,170 B1 | 4/2005 | Kauffman et al. |
| 6,915,530 B1 | 7/2005 | Kauffman et al. |
| 6,920,614 B1 | 7/2005 | Schindler et al. |
| 6,928,175 B1 | 8/2005 | Bader et al. |
| 6,942,595 B2 | 9/2005 | Hrazdera |
| 7,003,275 B1 | 2/2006 | Petrovic |
| 7,029,293 B2 | 4/2006 | Shapson et al. |
| 7,039,432 B2 | 5/2006 | Strater et al. |
| 7,048,106 B2 | 5/2006 | Hou |
| 7,127,734 B1 | 10/2006 | Amit |
| 7,162,731 B2 | 1/2007 | Reidhead et al. |
| 7,167,693 B2 | 1/2007 | Bachman et al. |
| 7,254,827 B1 | 8/2007 | Terreault |
| 7,283,479 B2 | 10/2007 | Ljungdahl et al. |
| 7,399,255 B1 | 7/2008 | Johnson et al. |
| 7,404,355 B2 | 7/2008 | Viaud et al. |
| 7,416,068 B2 | 8/2008 | Ray et al. |
| 7,454,252 B2 | 11/2008 | El-Sayed |
| 7,464,526 B2 | 12/2008 | Coenen |
| 7,505,819 B2 | 3/2009 | El-Sayed |
| 7,508,284 B2 | 3/2009 | Shafer |
| 7,530,091 B2 | 5/2009 | Vaughan |
| 7,592,883 B2 | 9/2009 | Shafer |
| 7,603,693 B2 | 10/2009 | Masuda et al. |
| 7,675,381 B2 | 3/2010 | Lin |
| 7,742,777 B2 | 6/2010 | Strater et al. |
| 7,748,023 B2 | 6/2010 | Weinstein et al. |
| 8,001,579 B2 | 8/2011 | Olson et al. |
| 8,213,457 B2 | 7/2012 | Kelma et al. |
| 8,286,209 B2 | 10/2012 | Egan et al. |
| 2001/0016950 A1 | 8/2001 | Matsuura |
| 2002/0141347 A1 | 10/2002 | Harp et al. |
| 2002/0141494 A1 | 10/2002 | Chappell |
| 2002/0144292 A1 | 10/2002 | Uemura et al. |
| 2002/0166124 A1 | 11/2002 | Gurantz et al. |
| 2002/0174423 A1 | 11/2002 | Fifield et al. |
| 2002/0174435 A1 | 11/2002 | Weinstein et al. |
| 2003/0084458 A1* | 5/2003 | Ljungdahl et al. ............ 725/124 |
| 2004/0076192 A1 | 4/2004 | Zerbe et al. |
| 2004/0147273 A1 | 7/2004 | Morphy |
| 2004/0172659 A1 | 9/2004 | Ljungdahl et al. |
| 2004/0229561 A1 | 11/2004 | Cowley et al. |
| 2005/0034168 A1 | 2/2005 | Beveridge |
| 2005/0047051 A1 | 3/2005 | Marland |
| 2005/0144649 A1* | 6/2005 | Bertonis et al. .............. 725/124 |
| 2005/0155082 A1 | 7/2005 | Weinstein et al. |
| 2005/0183130 A1 | 8/2005 | Sadja et al. |
| 2005/0210977 A1 | 9/2005 | Yan |
| 2005/0283815 A1* | 12/2005 | Brooks et al. ................. 725/126 |
| 2005/0289632 A1 | 12/2005 | Brooks et al. |
| 2006/0015921 A1 | 1/2006 | Vaughan |
| 2006/0041918 A9* | 2/2006 | Currivan et al. .............. 725/111 |
| 2006/0148406 A1 | 7/2006 | Strater et al. |
| 2006/0191359 A1 | 8/2006 | Tarasinski et al. |
| 2006/0205442 A1 | 9/2006 | Phillips et al. |
| 2006/0241838 A1 | 10/2006 | Mongiardo et al. |
| 2006/0282871 A1 | 12/2006 | Yo |
| 2007/0288981 A1 | 12/2007 | Mitsuse et al. |
| 2007/0288982 A1 | 12/2007 | Donahue |
| 2008/0001645 A1 | 1/2008 | Kuroki |
| 2008/0022344 A1 | 1/2008 | Riggsby |
| 2008/0040764 A1 | 2/2008 | Weinstein et al. |
| 2008/0075012 A1 | 3/2008 | Zielinski et al. |
| 2008/0120667 A1 | 5/2008 | Zaltsman |
| 2008/0127287 A1 | 5/2008 | Alkan et al. |
| 2008/0157898 A1 | 7/2008 | Palinkas et al. |
| 2008/0247401 A1 | 10/2008 | Bhal et al. |
| 2008/0247541 A1 | 10/2008 | Cholas et al. |
| 2008/0271094 A1 | 10/2008 | Kliger et al. |
| 2008/0313691 A1 | 12/2008 | Cholas et al. |
| 2009/0031391 A1 | 1/2009 | Urbanek |
| 2009/0047917 A1 | 2/2009 | Phillips et al. |
| 2009/0077608 A1 | 3/2009 | Romerein et al. |
| 2009/0153263 A1 | 6/2009 | Lin |
| 2009/0154369 A1 | 6/2009 | Helvig et al. |
| 2009/0165070 A1 | 6/2009 | McMullin et al. |
| 2009/0180782 A1 | 7/2009 | Bernard et al. |
| 2009/0217325 A1 | 8/2009 | Kliger et al. |
| 2009/0316608 A1 | 12/2009 | Singh et al. |
| 2009/0320085 A1 | 12/2009 | Wang |
| 2009/0320086 A1 | 12/2009 | Rijssemus et al. |
| 2010/0017842 A1 | 1/2010 | Wells |
| 2010/0095344 A1 | 4/2010 | Newby et al. |
| 2010/0100912 A1 | 4/2010 | Olson et al. |
| 2010/0100918 A1 | 4/2010 | Egan, Jr. et al. |
| 2010/0100921 A1 | 4/2010 | Olson et al. |

| | | | |
|---|---|---|---|
| 2010/0125877 A1 | 5/2010 | Wells et al. | |
| 2010/0146564 A1 | 6/2010 | Halik et al. | |
| 2010/0194489 A1 | 8/2010 | Kearns et al. | |
| 2010/0225813 A1 | 9/2010 | Hirono et al. | |
| 2010/0266000 A1 | 10/2010 | Froimovich et al. | |
| 2011/0010749 A1 | 1/2011 | Alkan | |
| 2011/0051014 A1 | 3/2011 | Wang et al. | |
| 2011/0069740 A1 | 3/2011 | Cowley et al. | |
| 2011/0072472 A1 | 3/2011 | Wells et al. | |
| 2011/0085452 A1 | 4/2011 | Kelma et al. | |
| 2011/0085480 A1 | 4/2011 | Keima et al. | |
| 2011/0085586 A1 | 4/2011 | Kelma et al. | |
| 2011/0088077 A1 | 4/2011 | Kelma et al. | |
| 2012/0054805 A1 | 3/2012 | Shafer et al. | |
| 2012/0054819 A1 | 3/2012 | Alkan et al. | |
| 2012/0081190 A1 | 4/2012 | Rijssemus | |

FOREIGN PATENT DOCUMENTS

| | | | |
|---|---|---|---|
| JP | 58-99913 | | 12/1981 |
| JP | 57-091055 | A | 6/1982 |
| JP | 58-101582 | A | 6/1983 |
| JP | 59026709 | | 8/1984 |
| JP | 61-157035 | A | 7/1986 |
| JP | 05-191416 | A | 7/1993 |
| JP | 07-038580 | A | 2/1995 |
| JP | 11-069334 | A | 3/1999 |
| JP | 2001-177580 | A | 6/2001 |
| JP | 2004-080483 | | 3/2004 |
| JP | 2005-005875 | | 1/2005 |
| JP | 2007-166109 | A | 6/2007 |
| JP | 2007-166110 | A | 6/2007 |
| WO | 0024124 | A1 | 4/2000 |
| WO | 0172005 | A1 | 9/2001 |
| WO | 0233969 | A1 | 4/2002 |
| WO | 02091676 | A1 | 11/2002 |

OTHER PUBLICATIONS

PCT/US2010/049568 International Search Report May 31, 2011.

Egan, Multi-Port Entry Adapter, Hub and Method for Interfacing a CATV Network and a MoCA Network, U.S. Appl. No. 12/255,008, filed Oct. 21, 2008.

Wells, CATV Entry Adapter and Method for Preventing Interference with eMTA Equipment from MoCA Signals, U.S. Appl. No. 12/691,149, filed Jan. 21, 2010.

Halik, CATV Entry Adapter and Method Utilizing Directional Couplers for MoCA Signal Communication, U.S. Appl. No. 12/704,833, filed Feb. 12, 2010.

Newby, Ingress Noise Inhibiting Network Interface Device and Method for Cable Television Networks, U.S. Appl. No. 12/250,229, filed Oct. 13, 2008.

Eagan, Multi-Port Entry Adapter, Hub and Method for Interfacing a CATV Network and a MoCA Network, U.S. Appl. No. 12/255,008, filed Oct. 21, 2008, Office Action Summary, dated Nov. 11, 2011.

Newby, Ingress Noise Inhibiting Network Interface Device and Method for Cable Television Networks, U.S. Appl. No. 12/250,229, filed Oct. 13, 2008, Office Action Summary, dated Jan. 23, 2012.

Wells, Passive Multi-Port Entry Adapter and Method for Preserving Downstream CATV Signal Strength within In-Home Network, U.S. Appl. No. 12/563,719, filed Sep. 21, 2009.

Wells, Passive Multi-Port Entry Adapter and Method for Preserving Downstream CATV Signal Strength within In-Home Network, U.S. Appl. No. 12/563,719, filed Sep. 21, 2009, Office Action Summary, dated Mar. 6, 2012.

Wells, Passive-Active Terminal Adapter and Method Having Automatic Return Loss Control, U.S. Appl. No. 12/175,366, filed Jul. 17, 2008.

Alkan, Home Network Frequency Conditioning Device and Method, U.S. Appl. No. 13/180,100, filed Jul. 11, 2011.

Safer, Home Network Frequency Conditioning Device, U.S. Appl. No. 13/178,149, filed Jul. 7, 2011.

Shafer, Low-Pass Filter Circuit, U.S. Appl. No. 13/167,497, filed Jun. 23, 2011.

Wells, Cable Television Entry Adapter, U.S. Appl. No. 13/245,510, filed Sep. 26, 2011.

Alkan, Method and Apparatus for Reducing Isolation in a Home Network, U.S. Appl. No. 13/333,060, filed Dec. 21, 2011.

Shafer, Upstream Bandwidth Conditioning Device, U.S. Appl. No. 12/760,153, filed Apr. 14, 2010.

* cited by examiner

UPSTREAM BANDWIDTH CONDITIONING DEVICE

FIELD OF THE INVENTION

The present invention relates generally to signal conditioning devices for use in community antenna television ("CATV") systems, and in particular to signal conditioning devices that increase the signal-to-noise ratio of an upstream bandwidth in a CATV system.

BACKGROUND OF THE INVENTION

The use of a CATV system to provide internet, voice over internet protocol ("VOIP") telephone, television, security, and music services is well known in the art. In providing these services, a downstream bandwidth (i.e., radio frequency ("RF") signals, digital signals, and/or optical signals) is passed from a supplier of the services to a user, and an upstream bandwidth (i.e., radio frequency ("RF") signals, digital signals, and/or optical signals) is passed from the user to the supplier. For much of the distance between the supplier and the user, the downstream bandwidth and the upstream bandwidth make up a total bandwidth that is passed via a signal transmission line, such as a coaxial cable. The downstream bandwidth is, for example, signals that are relatively higher in frequency within the total bandwidth of the CATV system while the upstream bandwidth is, for example, signals that are relatively lower in frequency.

In stark contrast to the orderly flow of the downstream bandwidth, the upstream bandwidth passing through each of the local distribution networks is a compilation of an upstream bandwidth generated within a premise of each user that is connected to the particular distribution network. The upstream bandwidth generated within each premise includes desirable upstream information signals from a modem, desirable upstream information signals from a set-top-box, other desirable signals, and undesirable interference signals, such as noise or other spurious signals. Many generators of such undesirable interference signals are electrical devices that inadvertently generate electrical signals as a result of their operation. These devices include vacuum cleaners, electric motors, household transformers, welders, and many other household electrical devices. Many other generators of such undesirable interference signals include devices that intentionally create RF signals as part of their operation. These devices include wireless home telephones, cellular telephones, wireless internet devices, citizens band ("CB") radios, personal communication devices, etc. While the RF signals generated by these latter devices are desirable for their intended purposes, these signals will conflict with the desirable upstream information signals if they are allowed to enter the CATV system.

Undesirable interference signals, whether they are inadvertently generated electrical signals or intentionally created RF signals, may be allowed to enter the CATV system, typically through an unterminated port, an improperly functioning device, a damaged coaxial cable, and/or a damaged splitter. As mentioned above, the downstream/upstream bandwidth is passed through coaxial cables for most of the distance between the user and the head end. This coaxial cable is intentionally shielded from undesirable interference signals by a conductive layer positioned radially outward from a center conductor and positioned coaxially with the center conductor. Similarly, devices connected to the coaxial cable typically provide shielding from undesirable interference signals. However, when there is no coaxial cable or no device connected to a port the center conductor is exposed to any undesirable interference signals and will function like a small antenna to gather those undesirable interference signals. Similarly, a coaxial cable or device having damaged or malfunctioning shielding may also gather undesirable interference signals.

In light of the forgoing, it should be clear that there is an inherent, system-wide flaw that leaves the upstream bandwidth open and easily impacted by any single user. For example, while the downstream bandwidth is constantly monitored and serviced by skilled network engineers, the upstream bandwidth is maintained by the user without the skill or knowledge required to reduce the creation and passage of interference signals into the upstream bandwidth. This issue is further compounded by the number of users connected together within a particular distribution network, especially knowing that one user can easily impact all of the other users.

Attempts at improving an overall signal quality of the upstream bandwidth have not been successful using traditional methods. A measure of the overall signal quality includes such components as signal strength and signal-to-noise ratio (i.e., a ratio of the desirable information signals to undesirable interference signals). Traditionally, increasing the strength of the downstream bandwidth has been accomplished by drop amplifiers employed in or near a particular user's premise. The success of these drop amplifiers is largely due to the fact that there are very low levels of undesirable interference signals present in the downstream bandwidth for the reasons explained more fully above. The inherent presence of the undesirable interference signals in the upstream bandwidth generated by each user has typically precluded the use of these typical, drop amplifiers to amplify the upstream bandwidth, because the undesirable interference signals are amplified by the same amount as the desirable information signals. Accordingly, the signal-to-noise ratio remains nearly constant, or worse, such that the overall signal quality of the upstream bandwidth is not increased when such a typical, drop amplifier is implemented.

For at least the forgoing reasons, a need is apparent for a device, which can increase the overall quality of the upstream bandwidth that includes increasing the signal strength and increasing the signal-to-noise ratio.

SUMMARY OF THE INVENTION

The present invention helps to reduce the effect of undesirable interference signals that are unknowingly injected into the main signal distribution system, through the upstream bandwidth, by a user.

In accordance with one embodiment of the present invention, a device may be used for conditioning an upstream bandwidth. The device can include a return path extending at least a portion of a distance between a supplier side connector and a user side connector, and a coupler connected within the return path, the coupler providing a secondary path. A detection circuit is connected electrically to the coupler. A microprocessor is connected electrically to the detection circuit. A variable signal level adjustment device is connected within the return path and can be controlled by the microprocessor.

In accordance with another embodiment of the present invention, a device for conditioning an upstream bandwidth can include a return path extending at least a portion of a distance between a supplier side connector and a user side connector; a coupler connected within the return path, the coupler providing a secondary path; a splitter circuit connected electrically downstream from the coupler; a noise floor detector connected electrically downstream from the splitter; a level detector connected electrically downstream from the splitter circuit; a variable signal level adjustment device connected within the return path electrically downstream from the coupler; and a microprocessor connected electrically downstream of the noise floor detector, the microprocessor to use the detected noise floor to control the variable signal level adjustment device.

In accordance with another embodiment of the present invention, a method is provided for conditioning an upstream bandwidth. The method can include receiving a upstream bandwidth from a user side connector; passing the upstream bandwidth through first and second different passive filters to obtain an upstream signal level and at least one offset signal level; measuring a signal strength of the upstream signal level and a signal strength of the at least one offset signal level; comparing a ratio of the upstream signal level strength and the at least one offset signal level strength to a first predetermined signal strength ratio to output a first compensation amount; dividing the upstream bandwidth and the downstream bandwidth from a user side connector; and adjusting the divided upstream bandwidth by a variable amount of signal level adjustment responsive to the first compensation value.

In accordance with another embodiment of the present invention, a device for conditioning an upstream bandwidth can include a return path extending at least a portion of a distance between a supplier side and a user side connector; a first portion of the return path extending between a user side diplexer filter and a supplier side diplexer filter; a coupler connected outside the first portion of the return path, the coupler providing a secondary path; a splitter circuit connected electrically downstream the coupler; an offset level detector connected electrically downstream of the splitter; a signal level detector connected electrically downstream the splitter circuit; a microprocessor connected electrically downstream the offset detector and the level detector; and a variable signal level adjustment device connected within first portion of the return path electrically downstream from the coupler, the variable signal level adjustment device being controlled by the microprocessor in accordance with an offset level detector outside the first portion of the return path.

BRIEF DESCRIPTION OF THE DRAWINGS

For a further understanding of the nature and objects of the invention, references should be made to the following detailed description of a preferred mode of practicing the invention, read in connection with the accompanying drawings in which.

DETAILED DESCRIPTION OF THE INVENTION

Figure 1:
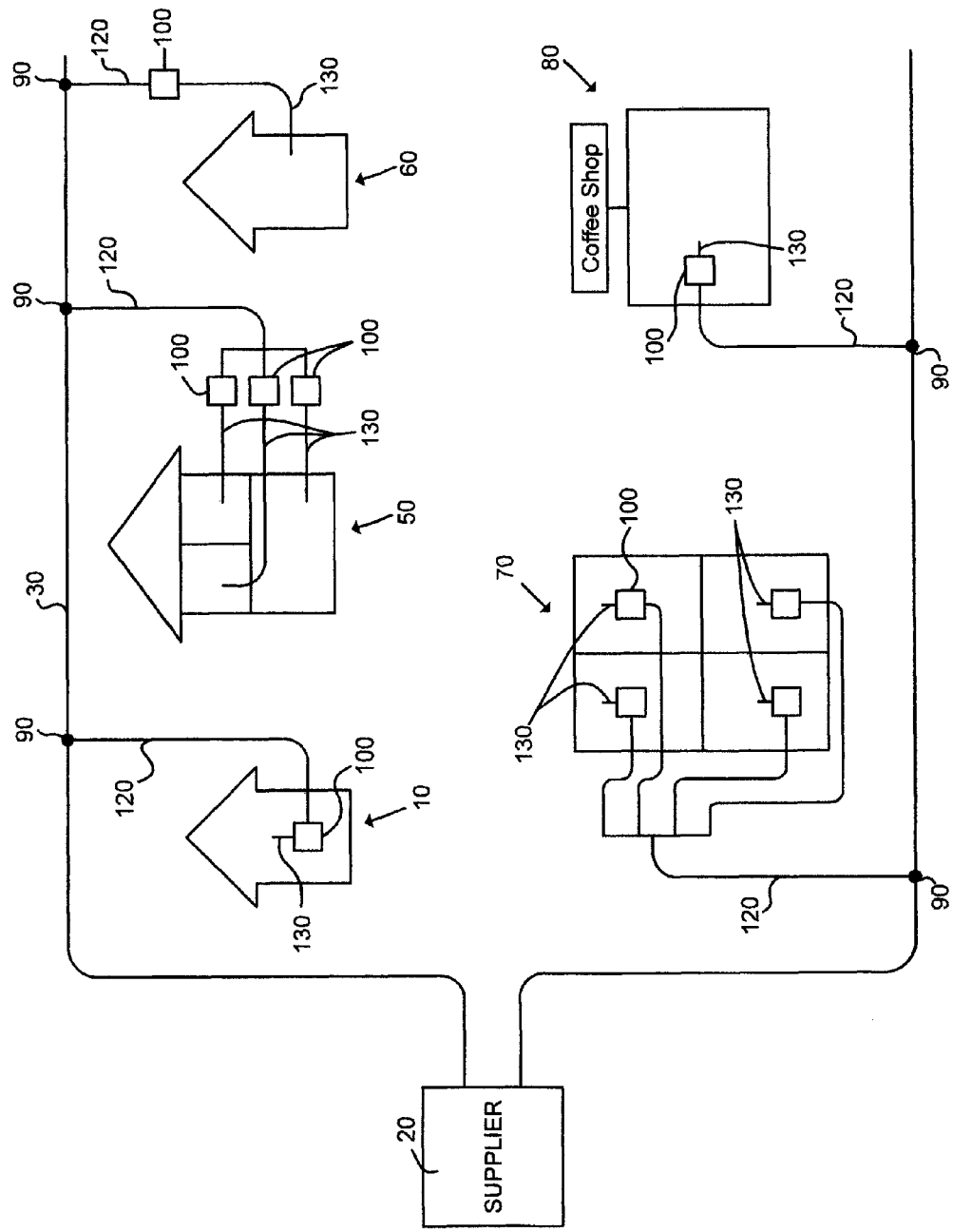
FIG. 1 is a graphical representation of a CATV system arranged in accordance with an embodiment of the present invention.

As shown in FIG. 1, a CATV system typically includes a supplier 20 that transmits a downstream bandwidth, such as RF signals, digital signals, and/or optical signals, to a user through a main distribution system 30 and receives an upstream bandwidth, such as RF signals, digital signals, and/or optical signals, from a user through the same main signal distribution system 30. A tap 90 is located at the main signal distribution system 30 to allow for the passage of the downstream/upstream bandwidth from/to the main signal distribution system 30. A drop transmission line 120 is then used to connect the tap 90 to a house 10, 60 an apartment building 50, 70, a coffee shop 80, and so on. As shown in FIG. 1, an upstream bandwidth conditioning device 100 of the present invention may be connected in series between the drop transmission line 120 and a user's premise distribution system 130.

Referring still to FIG. 1, it should be understood that the upstream bandwidth conditioning device 100 can be placed at any location between the tap 90 and the user's premise distribution system 130. This location can be conveniently located within the premise (e.g., the house 10, the apartment building 70, etc.), or proximate to the premise (e.g., the house 60, the apartment building 50, etc.). It should be understood that the upstream bandwidth conditioning device 100 can be placed at any location, such as the coffee shop 80 or other business, where CATV services, including internet services, VOIP services, or other unidirectional/bidirectional services are being used.

Figure 2:
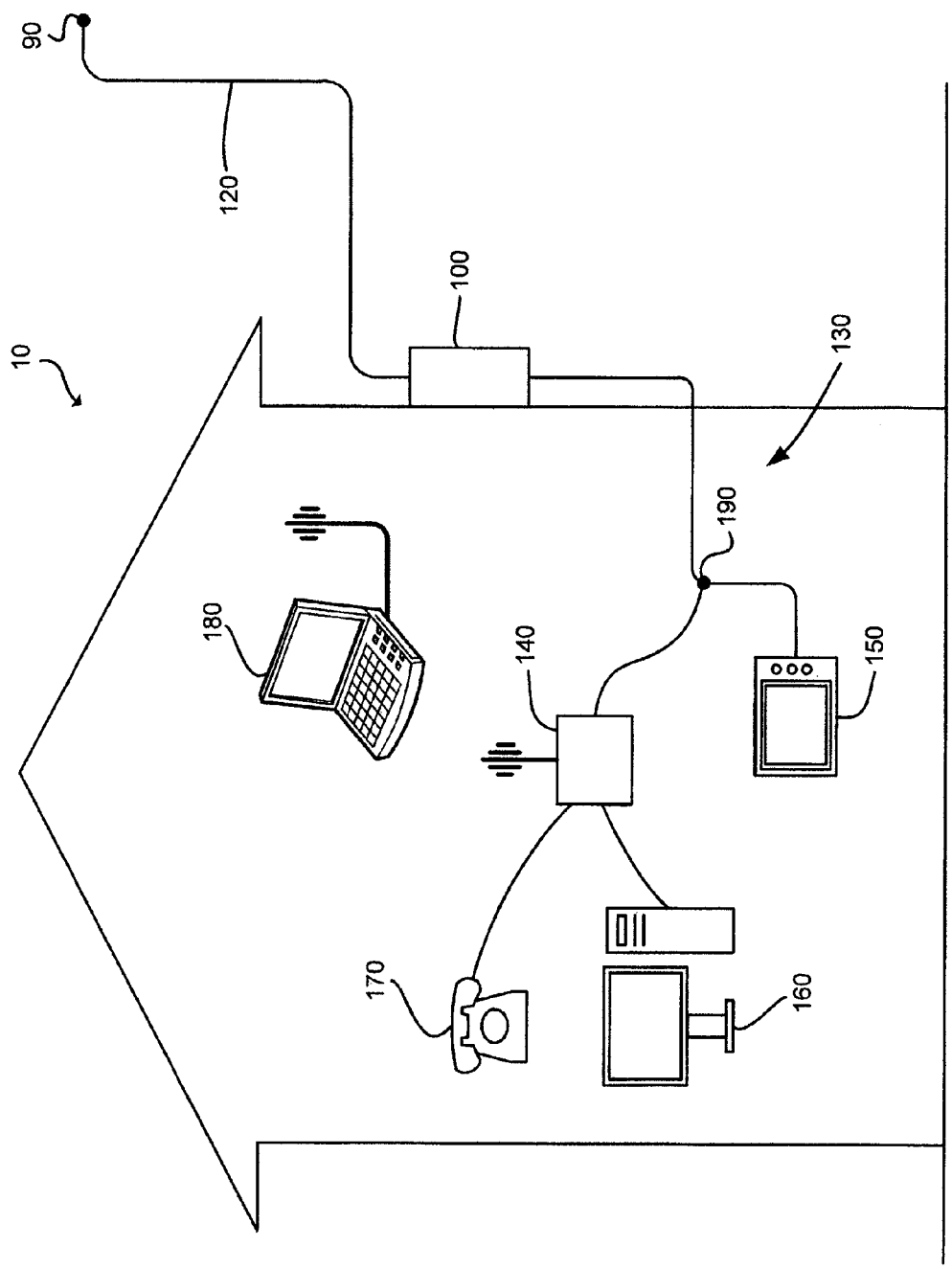
FIG. 2 is a graphical representation of a user's premise arranged in accordance with an embodiment of the present invention.

As shown in FIG. 2, the user's premise distribution system 130 may be split using a splitter 190 so that downstream/upstream bandwidth can pass to/from a television 150 and a modem 140 in accordance with practices well known in the art. The modem 140 may include VOIP capabilities affording telephone 170 services and may include a router affording internet services to a desktop computer 160 and a laptop computer 180, for example.

Additionally, it is common practice to provide a set-top box ("STB") or a set-top unit ("STU") for use directly with the television 150. For the sake of clarity, however, there is no representation of a STB or a STU included in FIG. 2. The STB and STU are mentioned here in light of the fact that many models utilize the upstream bandwidth to transmit information relating to "pay-per-view" purchases, billing, utilization, and other user interactions, all of which may require information to be sent from the STB or STU to the supplier 20. Accordingly, it should be understood that even though FIG. 2 explicitly shows that there is only one upstream bandwidth conditioning device 100 used for one premise device (i.e., the modem 140), each upstream bandwidth conditioning device 100 may be used with two or more premise devices (e.g., a modem, a STB, a STU, and/or a dedicated VOIP server) that transmit desirable upstream information signals via the upstream bandwidth.

The term "premise device" is used throughout to describe any one or more of a variety of devices that generate desirable portions of an upstream bandwidth. More specifically, the term premise device is used to describe devices located on or proximate to a user's premise that either receive the downstream bandwidth, transmit information toward the supplier 20 via the upstream bandwidth, or both. These premise devices include internet access modems, STBs, STUs, televisions, premise security monitoring devices, and any future devices that may have a need to report or otherwise provide information via the upstream bandwidth.

Further, while not shown explicitly in FIG. 2, there may be two (or more) upstream bandwidth conditioning devices 100 located within or proximate to a single premise. For example, there may be an upstream bandwidth conditioning device 100 located between the modem 140 and the splitter 190 and another upstream bandwidth conditioning device 100 located between an STB or STU on the television 150 and the splitter 190. Similarly, there may be an upstream bandwidth conditioning device 100 located at any point in the premise distribution system 130 where an upstream bandwidth is being passed (e.g., from a modem, a STB, a STU, a VOIP server, etc.).

Further, while not shown explicitly in FIG. 2, there may by one upstream bandwidth conditioning device 100 located proximate to two user premises when there is one drop transmission line 120 used to connect the tap 90 to both of the two user premises. Even though such an arrangement is not considered ideal, because the upstream bandwidth from two users may be merged prior to being conditioned, such an arrangement may be necessary when the two premises are located too closely to one another for the physical placement of separate upstream bandwidth conditioning devices 100.

It should be understood that the goal of placing the upstream signal conditioning device 100 into one of the locations described above is to increase the overall quality of the upstream bandwidth in the main distribution system 30 by increasing the signal-to-noise ratio of the upstream bandwidth leaving the user's premise before that particular user's upstream bandwidth is merged with those of other users. As discussed above, merely amplifying the upstream bandwidth fails to achieve the desired result because the undesirable interference signals present in the upstream bandwidth are also amplified.

Figure 3:
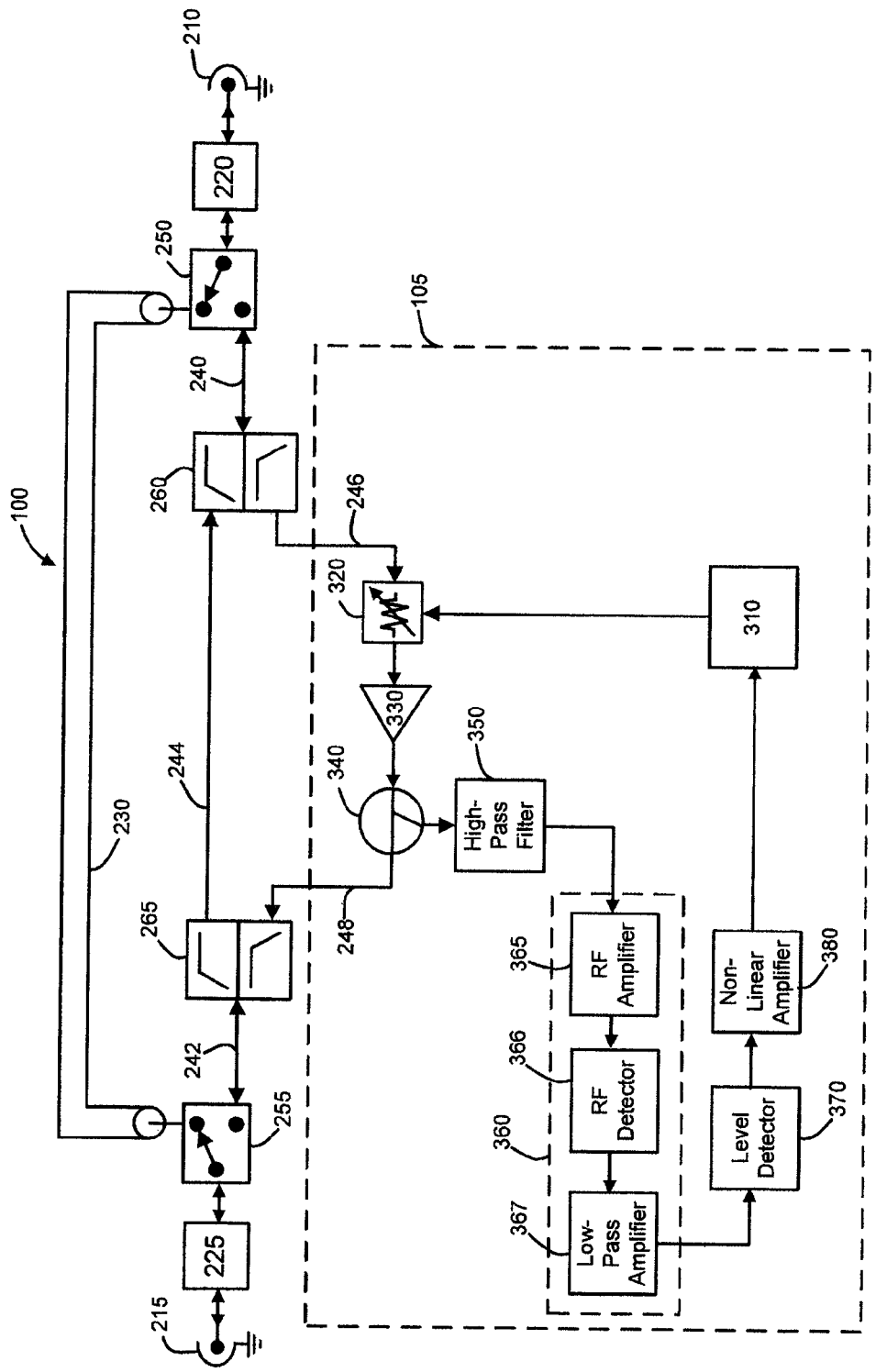
FIG. 3 is a circuit diagram representing a conditioning device including an upstream section made in accordance with yet another embodiment of the present invention.

Referring now to FIG. 3, the description of the upstream bandwidth conditioning device 100 will be broken down into two general topics of discussion, general components and an upstream bandwidth conditioning section 105 ("upstream section 105"). The general components will be discussed first to develop the terminology used throughout and to help explain how the upstream bandwidth is passed to the upstream section 105. The hardware, the operation, and the control of the upstream section 105 will be discussed thereafter.

Referring still to FIG. 3, the upstream bandwidth conditioning device 100 may include a user side connector 210 and a supplier side connector 215. Each of these connectors 210, 215 may be any of the connectors used in the art for connecting a signal cable to a device. For example, each of the user side connector 210 and the supplier side connector 215 may be a traditional female "F-type" connector.

A user side surge protector 220 and a supplier side surge protector 225 may be provided electrically adjacent the user side connector 210 and the supplier side connector 215, respectively. This positioning of the surge protectors 220, 225 allows for the protection of electrically fragile components (discussed more fully below) positioned between the surge protectors 220, 225. Each of the user side surge protector 220 and the supplier side surge protector 225 may be any of the surge protectors known in the art for electronic applications.

A user side switch 250 and a supplier side switch 255 each have two positions. In a first, default position (shown in FIG. 3), the switches 250, 255 pass signals through a bypass path 230. In a second position, the user side switch 250 and the supplier side switch 255 electrically connect the user side connector 210 to a user side main path 240 and the supplier side connector 215 to the a supplier side main path 242, respectively. As will be discussed further below, the primary components of the upstream bandwidth conditioning device 100 are electrically connected in series between the user side main path 240 and the supplier side main path 242.

The switches 250, 255 allow the total bandwidth to pass through the bypass path 230 in the event of a fault within the upstream bandwidth conditioning device 100, such as an electrical power failure. The switches 250, 255 may be any of the SPDT (Single Pole Double Throw) switches known in the art. For example the switches 250, 255 may be selected and installed such that when there is no electrical power present to the upstream bandwidth conditioning device 100, the switches 250, 255 automatically select the first, default position to pass the total bandwidth through the bypass path 230. Conversely, when there is electrical power present, the switches 250, 255 move toward their second position passing the total bandwidth to the main paths 240, 242. In the event of an electrical short within the upstream bandwidth conditioning device 100, it is likely that the short will cause an additional current flow that will ultimately result in the destruction of a fuse or in an opening of a circuit breaker type device (not shown). Accordingly, such a short will likely result in a loss of power to switches allowing the total bandwidth to pass through the bypass path 230.

A microprocessor 310 (discussed more fully below) may also be used to actuate the switches 250, 255 to their first position (i.e., to the bypass path 230) when a fault, other than an electrical power loss, is detected within the upstream bandwidth conditioning device 100. While the circuitry for such a connection is not shown in FIG. 3, it should be understood that the control by the microprocessor 310 should be in addition to the switches 250, 255 automatic positioning due to an electrical failure.

The term "microprocessor" used throughout should be understood to include all active circuits capable of performing the functions discussed herein. For example, the microprocessor 310 may be replaced with a microcontroller, a system specific digital controller, or a complex analog circuit.

The bypass path 230 may be a coaxial cable, an unshielded wire, and/or a metallic trace on a circuit board. All of these options are capable of passing the total bandwidth with little signal attenuation.

A user side diplexer 260 and a supplier side diplexer 265 are electrically coupled to the user side main path 240 and the supplier side main path 242, respectfully. The diplexers 260, 265 are arranged and configured to create a forward path 244 and a return path 246, 248 there between. Each of the diplexers 260, 265 may function like a combination of a splitter, a high-pass filter, and a low-pass filter, the splitter dividing the respective main path 240, 242 into two signal paths, one for each of the low-pass filter and the high-pass filter. Using the terms of this combination, each of the high-pass filters passes the downstream bandwidth, and each of the low-pass filters passes the upstream bandwidth. In the present example, the downstream bandwidth passes along the forward path 244 between the diplexers 260, 265. Of particular importance to the present upstream bandwidth conditioning device 100, the upstream bandwidth passes along the return path 246, 248 between the diplexers 260, 265. The remainder of the description below focuses on the hardware, the operation, and the control of the upstream section 105 attached to or within the return path 246, 248.

In an effort to set the stage for the following discussion, the hardware, the operation, and the control of the upstream section 105 will be first described here in very general detail. The upstream section 105 selectively attenuates the upstream bandwidth in increments with the knowledge that a typical premise device will increase the power with which it transmits its portion of the upstream bandwidth (i.e., the desirable upstream bandwidth) to account for the added attenuation. The result is that the desirable upstream bandwidth will be larger in percentage than the remaining portions (i.e., the undesirable upstream bandwidth). To accomplish these goals, the upstream section 105 must be able to precisely measure the level of the desirable upstream bandwidth in order to increase the amount of attenuation without adding more attenuation than the premise device can account for in terms of increasing its output power. Precise measurements of the desirable upstream bandwidth level are difficult, if not impossible, to make using only traditional level detectors.

The desirable upstream bandwidth is difficult to measure due to the inherent functional characteristics of premise devices. For example, a premise device typically transmits a desirable upstream bandwidth only when that premise device is being requested to transmit information. For example, a premise device, such as an internet access modem, typically transmits information only when a user sends information to the internet. Because there is no way to anticipate when such information is to be sent, the desirable upstream bandwidth created by the premise device must be assumed to be time independent and time discontinuous. Further, the continuity of the information that is being transmitted varies greatly, such as between a simple Pay-Per-View purchase request and an Internet upload of a large, detailed photograph. In other words, the portion of the upstream bandwidth created by a premise device may occur at any time and may occur for any length of time. The upstream section 105 includes features that are used specifically to identify this time independent and time discontinuous desirable upstream bandwidth.

Figure 4:
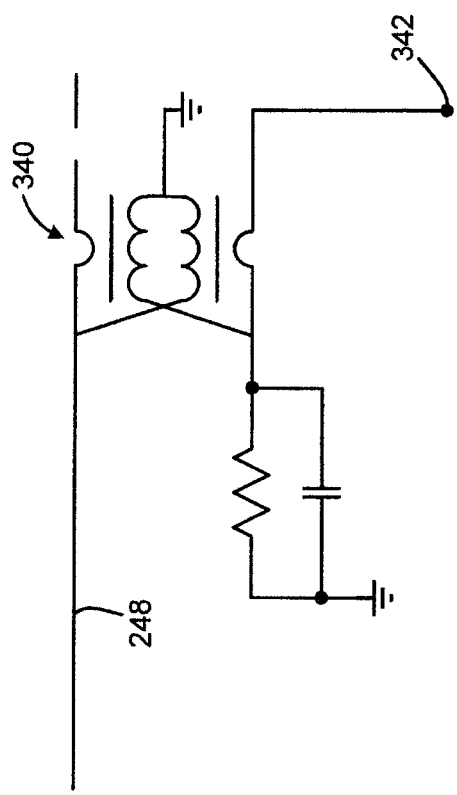
FIG. 4 is a circuit diagram representing a coupler used in a conditioning device made in accordance with one embodiment of the present invention.

The upstream section 105 includes a coupler 340 connected within the return path 246, 248 to pass a portion of the upstream bandwidth, in terms of power and/or frequency range, to subsequent devices in the upstream section 105 via secondary path proceeding from a coupler output 342 (FIG. 4). One skilled in the art would readily understand, based on the present description and the size requirement of a particular installation, which type of coupler would be suitable for the present purpose. For example, a simple resistor, a power divider, a directional coupler, and/or a splitter may be used with careful consideration of the effects that these alternatives may have on the characteristic impedance of the upstream bandwidth conditioning device 100. Individual components present in one embodiment of the coupler 340 are represented in FIG. 4.

The term "connected" is used throughout to mean optically or electrically positioned such that current, voltages, and/or light are passed between the connected components. It should be understood that the term "connected" does not exclude the possibility of intervening components or devices between the connected components. For example, the coupler 340 is connected to a RF amplifier 365 even though a high pass filter 350 is shown to be positioned in an intervening relation between the coupler 340 and the RF amplifier.

The terms "connected electrically downstream" and "connected electrically upstream" may also be used throughout to aid in the description regarding where or how the two components are connected. As an example, when a second device is connected electrically downstream from a first device, the second device receives signal from the first device. This same arrangement could also be described as having the first device connected electrically upstream from the second device.

Figure 5:
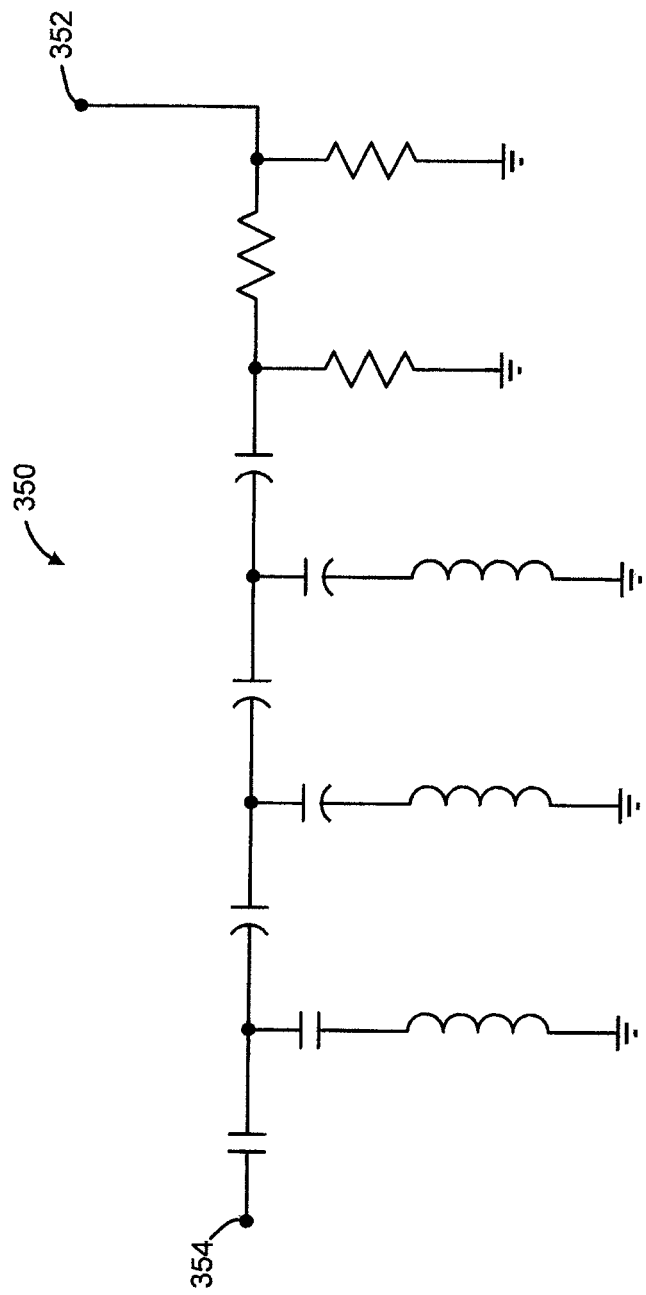
FIG. 5 is a circuit diagram representing a high pass filter used in a conditioning device made in accordance with one embodiment of the present invention.

Referring back to FIG. 3, the high-pass filter 350 is connected electrically downstream from the coupler 340 such that the coupler output 342 is electrically connected to a high-pass filter input 352 (FIG. 5). The high-pass filter 350 is utilized in this instance to pass only a segment of the upstream bandwidth through to the remaining devices, discussed below, via a high-pass filter output 354 (FIG. 5). Such a high-pass filter 350 may not be required in all instances, but may be beneficial in that it attenuates segments of the upstream bandwidth that are known not to carry the desirable upstream bandwidth. For example, if the premise devices are known to provide their desirable upstream bandwidth in a specific segment of the upstream bandwidth, it may be beneficial to configure the high-pass filter 350 to attenuate segments of the upstream bandwidth below the specific segment of the upstream bandwidth where the premise device transmits. One skilled in the art would readily understand, based on the present description and the size requirements of a particular installation, which type of high-pass filter would be suitable for the present purpose. Individual components present in one embodiment of the high-pass filter 350 are represented in FIG. 5.

Figure 6:
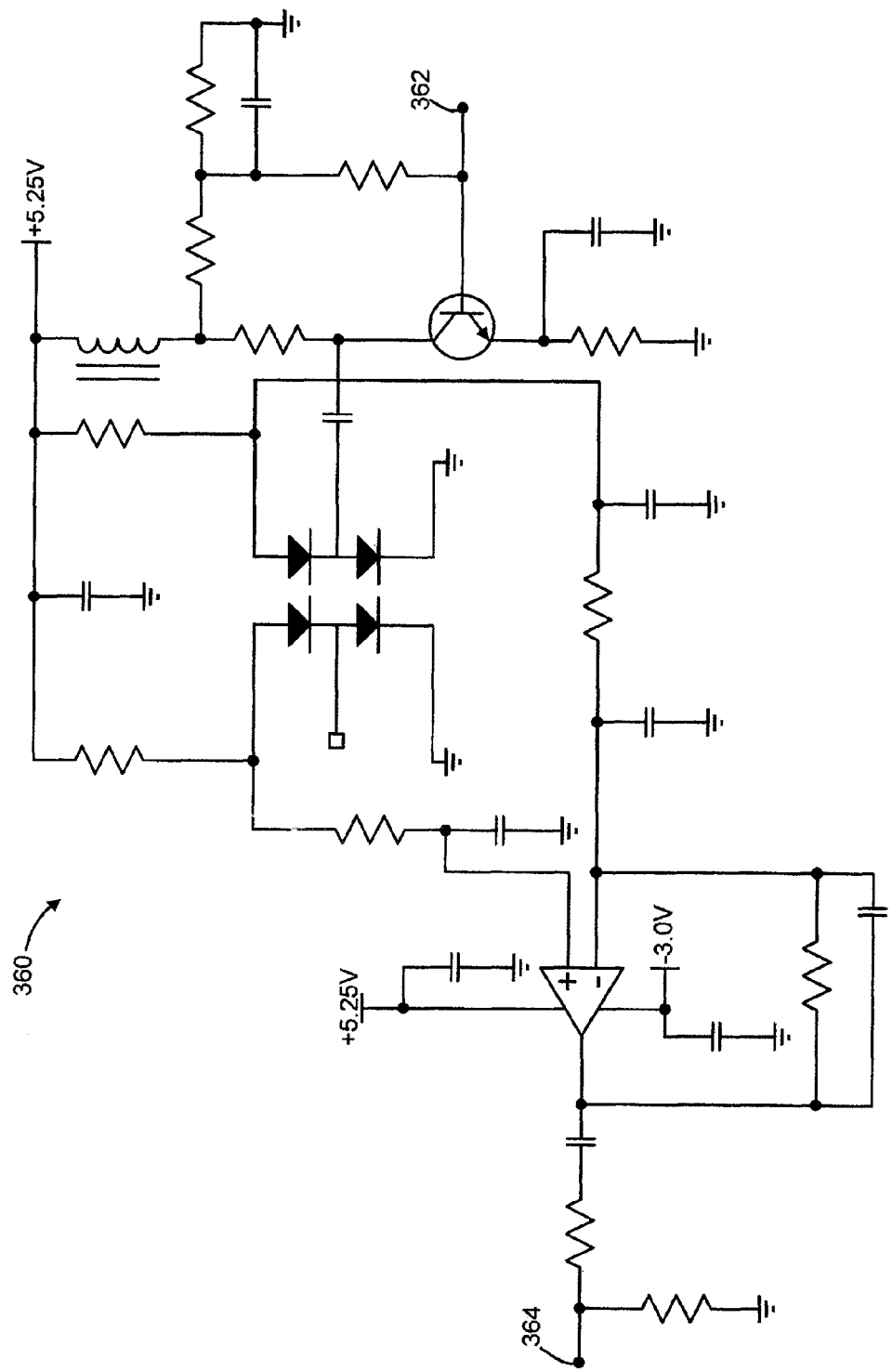
FIG. 6 is a circuit diagram representing a RF detection circuit used in a conditioning device made in accordance with one embodiment of the present invention.

A RF detection circuit 360 is connected electrically downstream from the high-pass filter 350 such that the high-pass filter output 354 is electrically connected to a RF detector input 362 (FIG. 6). The RF detection circuit 360 includes a RF amplifier 365 a RF detector 366 and a low-pass amplifier 367. The RF amplifier 365 amplifies the portion of the downstream bandwidth passed through the high-pass filter 350 in preparation for the RF detector 366. The RF detector 366 functions as an inverse Laplace transform, the Laplace transform being a widely used integral transform, to convert the portion of the downstream bandwidth from a frequency domain voltage stream into a time domain voltage stream. The inverse Laplace transform is a complex integral, which is known by various names, the Bromwich integral, the Fourier-Mellin integral, and Mellin's inverse formula. An alternative formula for the inverse Laplace transform is given by Post's inversion formula. The time domain voltage stream is then passed to the low-pass amplifier 367, which amplifies the voltages while discriminating in the time between those having suitable signal duration and those that are to short for usage within the following circuitry stages.

Figure 8:
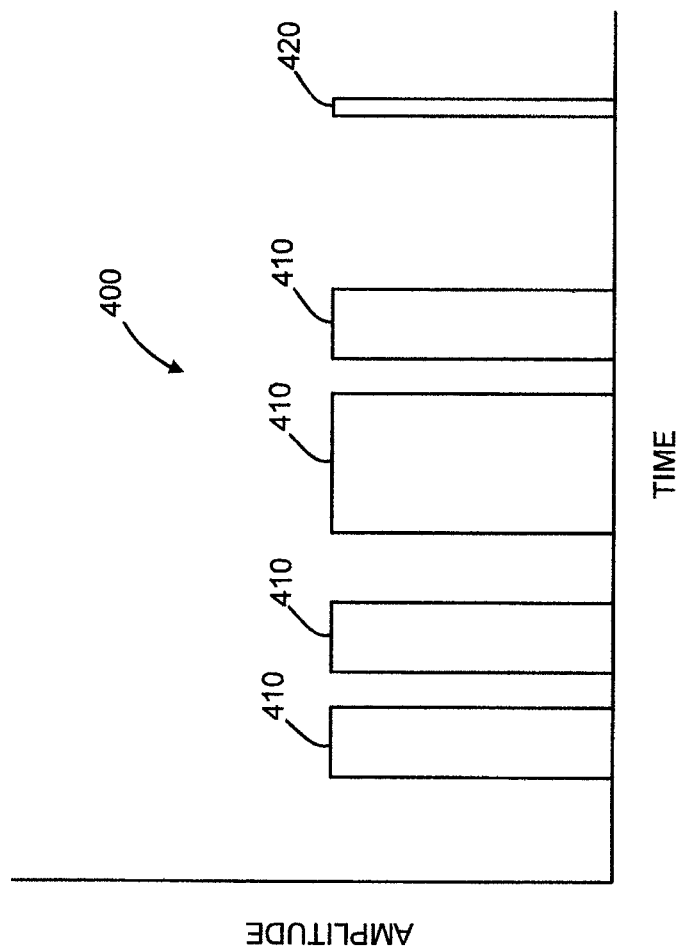
FIG. 8 is a graphical representation of a voltage stream passing from a RF detector to a low-pass amplifier within a RF detection circuit used in a conditioning device made in accordance with one embodiment of the present invention.

As an example, FIG. 8 represents a time domain voltage stream output 400 from the RF detector 366 to the low-pass amplifier 367. The time domain voltage stream 400 includes increased voltage levels 410 and 420 that last for varying amounts of time. Longer sections of increased voltage 410 typically represent significant information being sent by a premise device, while shorter sections of increased voltage 420 typically represent "pings," which are very short bursts of little information. These longer sections of increased voltage have a period that may be typical for a particular premise device. In other words, the longer sections of increased voltages 410 may have shorter or longer sections of lower voltage between the longer sections of increased voltages 410. This period, which may change based on the types of premise devices present, will be important when discussing a level detector 370.

Figure 9:
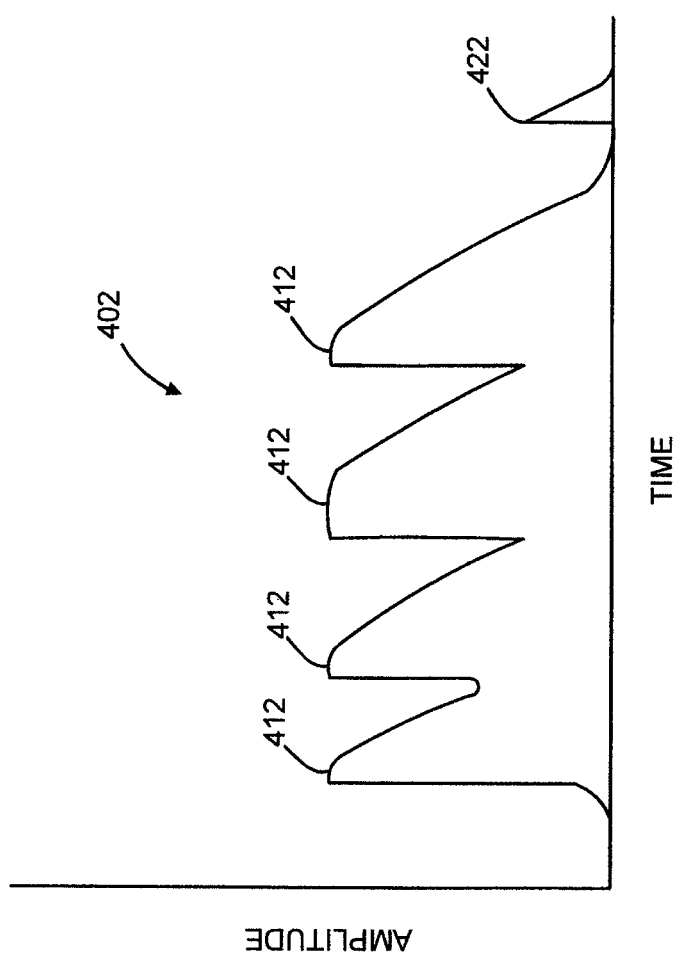
FIG. 9 is a graphical representation of a voltage stream passing from a low-pass amplifier within a RF detection circuit to a level detector used in a conditioning device made in accordance with one embodiment of the present invention.

Referring now to FIG. 9, the low-pass amplifier 367 creates a voltage stream 402 where the longer periods of increased voltage 410 (FIG. 8) result in higher voltages 412 and where the shorter periods of increased voltage 420 (FIG. 8) result in lower voltages 422. This voltage stream 402 is then output to the level detector 370 from a RF detection circuit output 364. One skilled in the art would readily understand, based on the present description and the size requirements of a particular installation, which type of components should be used to create the RF detection circuit 360. Individual components present in one embodiment of the RF detection circuit 360 are represented in FIG. 6.

Figure 7:
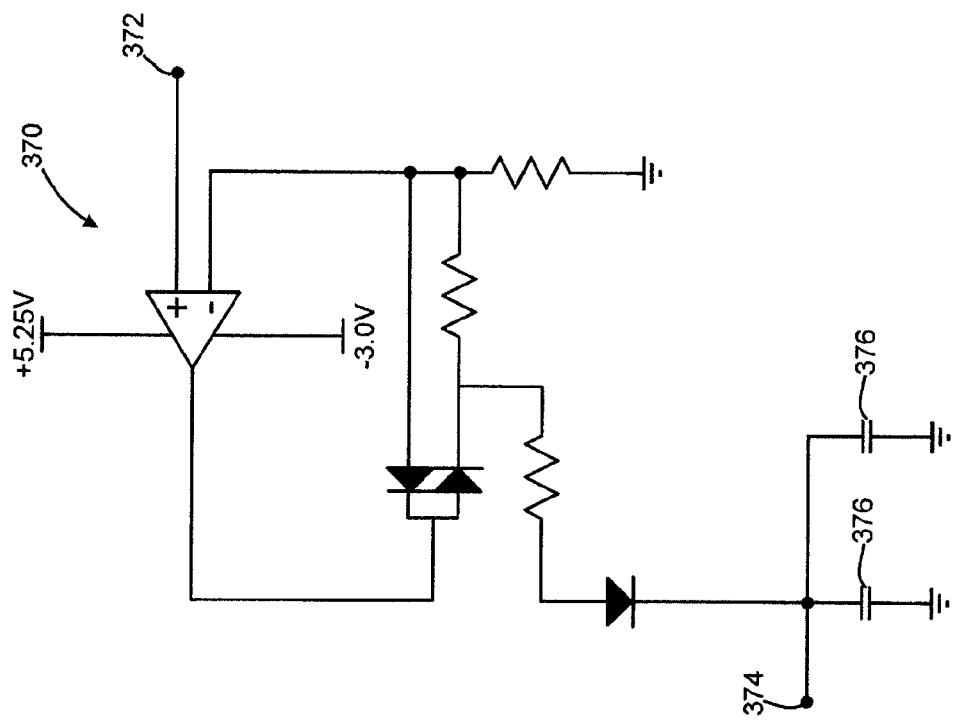
FIG. 7 is a circuit diagram representing a level detector used in a conditioning device made in accordance with one embodiment of the present invention.

The level detector 370 is connected electrically downstream from the RF detection circuit 360 such that the output of the RF detection circuit is electrically connected to a level detector input 372 (FIG. 7). The level detector 370 generates additional current based on the voltage stream provided by the RF detection circuit 360, and the level detector 370 includes at least one diode and at least one relatively large capacitor 376 to store the current provided. A voltage stream 404 (FIG. 10) provided from the large capacitor 376 to the level detector output 374 is relative to the voltage stream 402 provided by the RF detection circuit 360 at the level detector input 372, except that any increased voltage 412, 422 is held for a duration longer than that of the voltage stream 402 from the RF detection circuit 360. The amount of duration that any increased voltage is held is strictly a factor of the sizing of the at least one capacitor, the sizing of an associated resistor, and the current drawn by subsequent devices.

Figure 10:
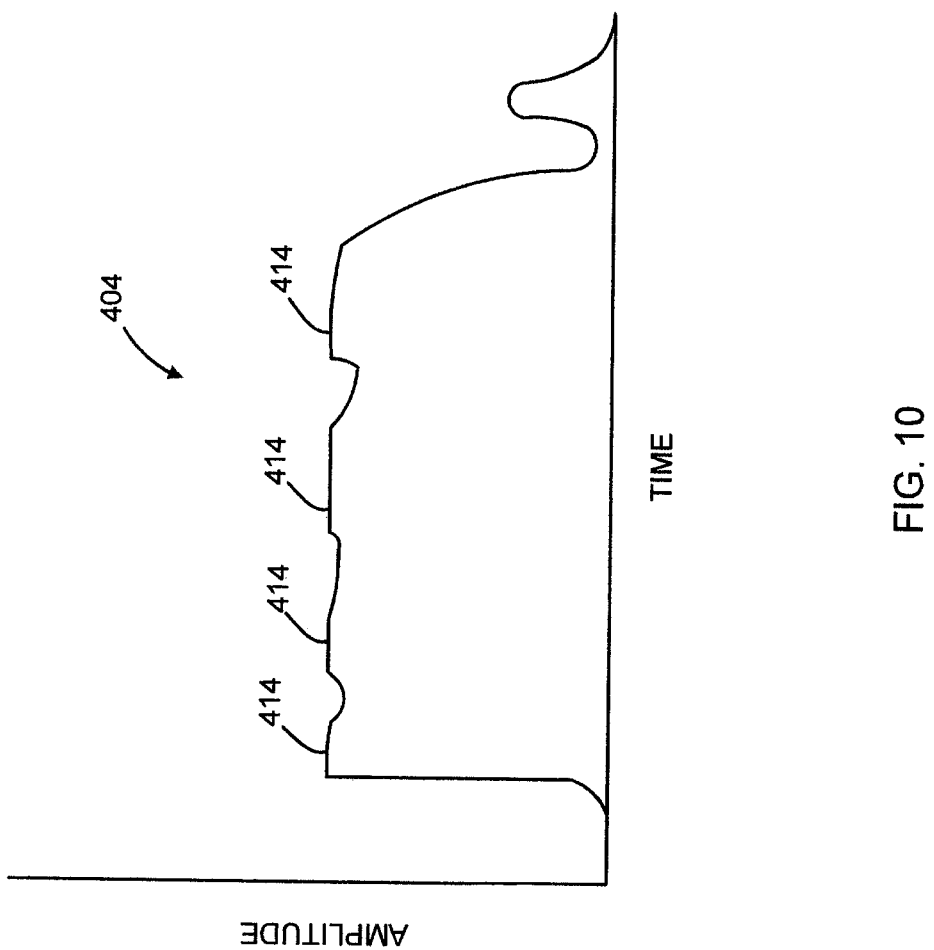
FIG. 10 is a graphical representation of a voltage stream passing from a level detector to a non-linear amplifier used in a conditioning device made in accordance with one embodiment of the present invention.

Referring now to FIG. 10, the level detector 370 creates the voltage stream 404 where the longer periods of increased voltage 412 (FIG. 9) are more consistent such that there is less voltage decline between the resulting longer periods of increased voltage 414. This voltage stream 404 is then output to a non-linear amplifier 380 from a level detector output 374.

Individual components present in one embodiment of the level detector 370 are represented in FIG. 7. While most of the components are self explanatory to one skilled in the art, it is notable that the level detector 370 made in accordance with one embodiment includes two 10 µF capacitors 376 sufficient to hold a voltage for up to six seconds. This amount of time has been found to be sufficient to join message voltages 412 (FIG. 9) in the voltage stream 402 (FIG. 9) for the measurements made by the microprocessor 310, discussed more fully below. The amount of time duration may be less or more depending on the congruity of the messages typically being sent and the speed of the processor 310.

More generally speaking, the duration needed for the present embodiment is approximately ten times the period of the longer sections of increased voltage 410 provided by the premise device. Accordingly, the duration may change depending on the premise devices present. Further, it should be understood that the term approximately is used here in relation to the "ten times" multiplier because less than ten times may work well enough if a low voltage threshold ("VIL") is reduced accordingly to allow for greater voltage drops between the longer sections of increased voltage 410. More than ten times may result in a duration that is too long, there the voltage may not drop soon enough past the VIL to properly stop a series. These statements will be understood once the VIL and its effect on a series is discussed more fully below. As would be understood by one skilled in the art based on the present description, the amount of capacitance desired for a particular amount of duration may be accomplished by one large capacitor or a plurality of smaller capacitors.

Figure 11:
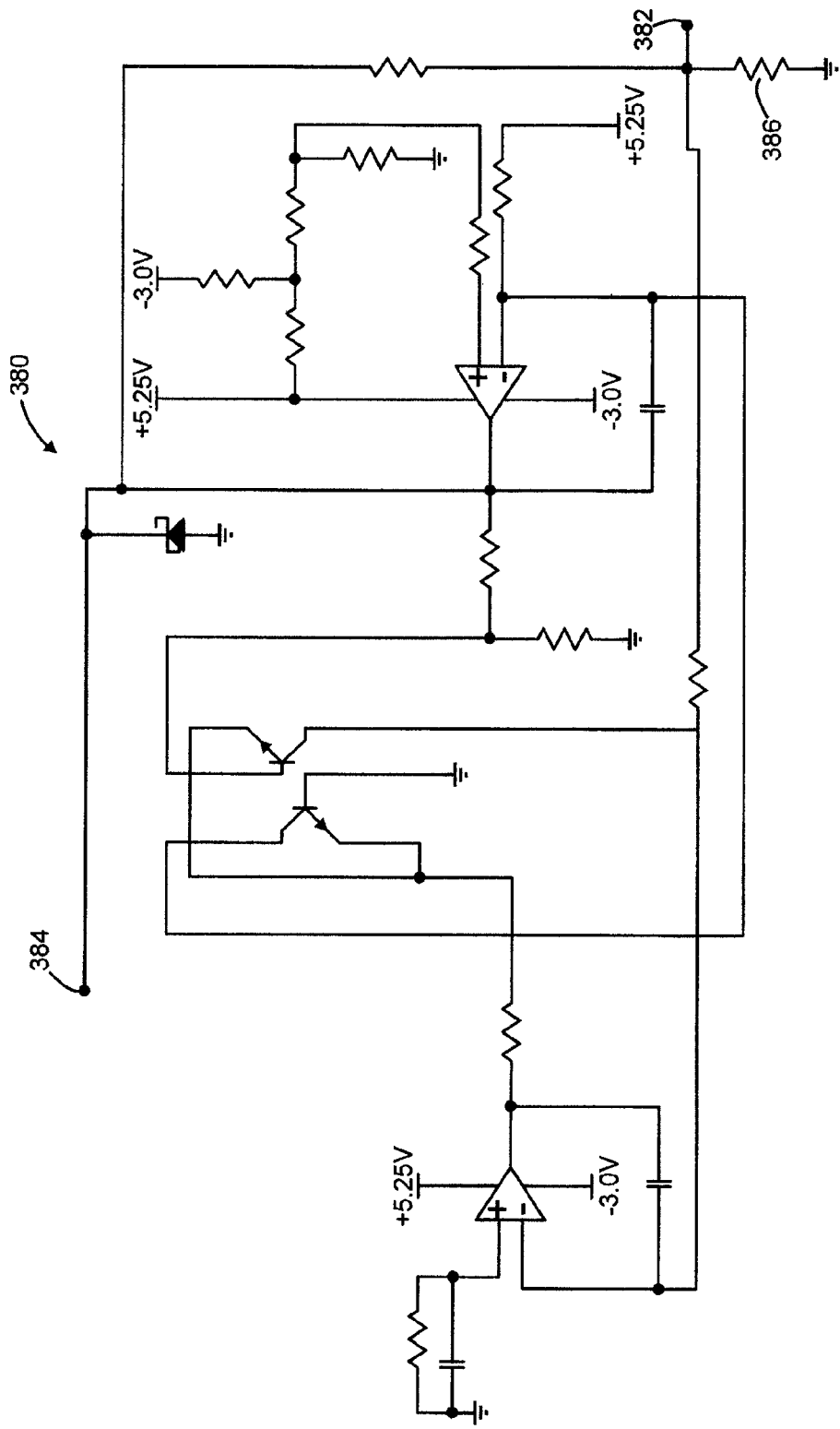
FIG. 11 is a circuit diagram of a non-linear amplifier used in a conditioning device made in accordance with one embodiment of the present invention.

Referring back to FIG. 3, the non-linear amplifier 380 is connected electrically downstream from the level detector 370 such that the level detector output 374 is electrically connected to a non-linear amplifier input 382 (FIG. 11). The non-linear amplifier 380 compresses the voltage stream 404 provided by the level detector 370 to provide additional resolution to lower voltages. Specifically, the non-linear amplifier 380 provides additional detail to lower voltages without unnecessarily providing additional resolution to higher voltages. This is important in the present embodiment of the upstream bandwidth conditioning device because the microprocessor 310 accepts a voltage stream from the non-linear amplifier 380 at the non-linear amplifier output 384 (FIG. 11) and converts it to a digital value in the range of 0-255. Additional resolution applied to the entire voltage stream from the level detector 370 would require more than 255 digital values, and a linear resolution of the voltage stream from the level detector 370 may result in poor quality measurements of the upstream bandwidth. Individual components present in one embodiment of the non-linear amplifier 380 are represented in FIG. 11. It should be understood that when additional resolution within the microprocessor 310 is available, the non-linear amplifier 380 may not be required.

The non-linear amplifier 380 is shown in FIG. 11 to include a resistor 386 positioned near the non-linear amplifier input 382. This resistor 386 allows for the voltage stream 404 from the level detector 370 to bleed off rather than to maintain a particular voltage indefinitely. Accordingly, it should be understood that this resistor 386 may be considered to be a part of either the level detector 370 or the non-linear amplifier 380.

Figure 12:
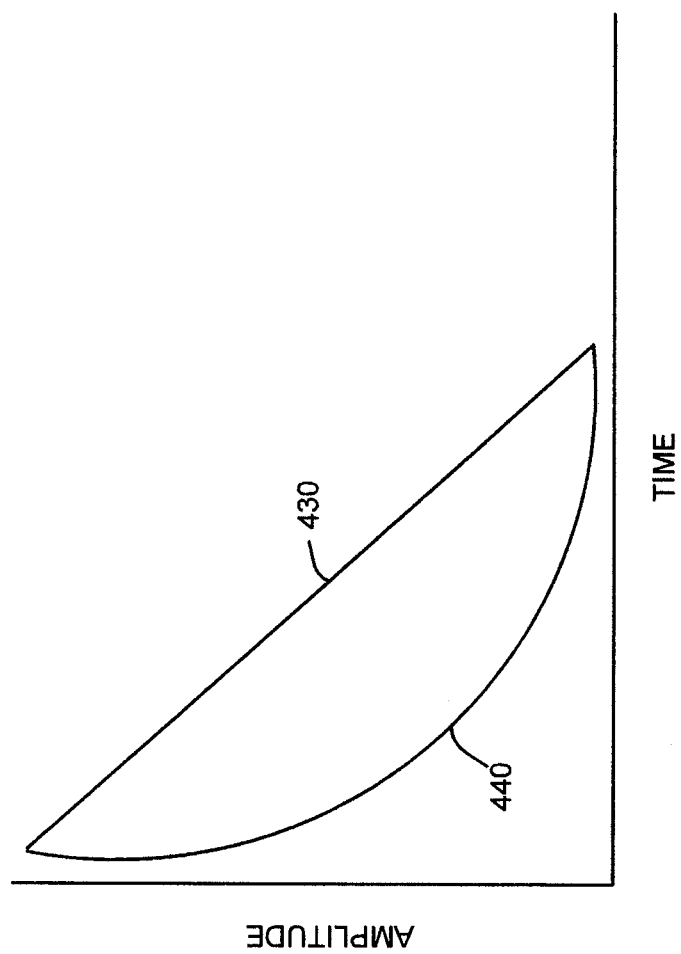
FIG. 12 is a graphical representation of a theoretical response of a non-linear amplifier in response to a linearly increasing voltage.

An example of a linearly changing input voltage stream 430 along with a non-linearly changing output voltage stream 440 can be seen in FIG. 12. As shown, at relatively low input voltage levels, the output voltage stream 440 changes significantly more in relation to any changes in the input voltage stream 430. However, at relatively high voltage levels, the output voltage stream 440 changes significantly less in relation to any changes in the input voltage stream 430.

Figure 13:
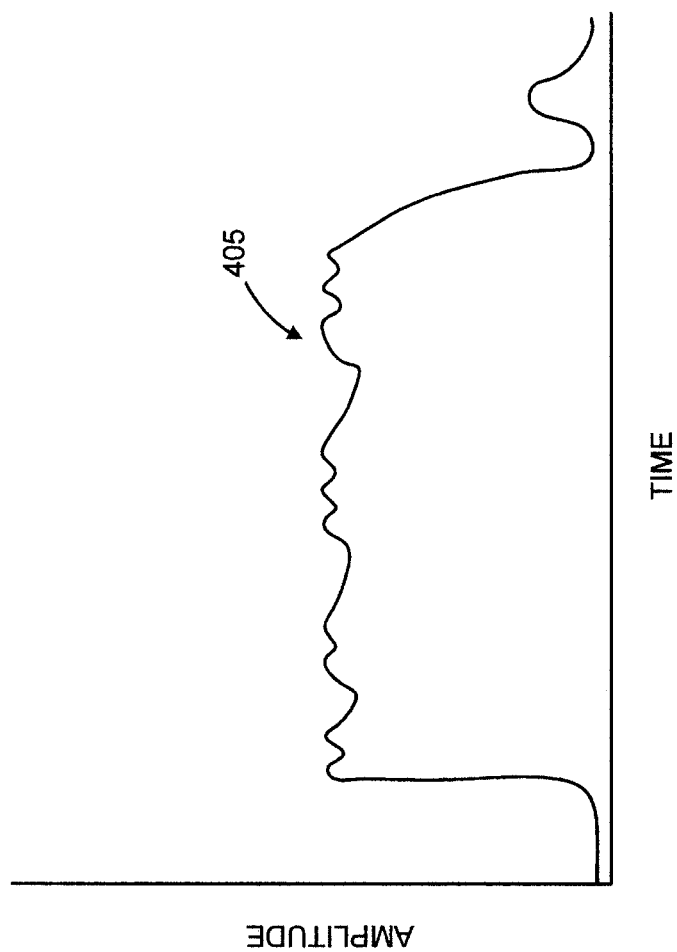
FIG. 13 is a graphical representation of a voltage stream passing from a non-linear amplifier to a microprocessor used in a conditioning device made in accordance with one embodiment of the present invention.

FIG. 13, represents an exemplary output voltage stream 405 produced in response to the voltage stream 404 represented in FIG. 10. As shown, the effect of the non-linear amplifier 380 is to emphasize details present in the lower voltages while deemphasizing the higher voltages. As mentioned above, this effect of the non-linear amplifier 380 helps provide additional resolution to the lower voltages for measurement purposes.

Referring again to FIG. 3, the microprocessor 310 may be electrically connected downstream from the non-linear amplifier 380 such that the microprocessor 310 is connected to the non-linear amplifier output 384. The microprocessor 310 measures the individual voltages from the non-linear amplifier 380 and may convert these voltages into a digital scale of 0-255. It should be understood that the present scale of 0-255 was chosen in the present embodiment only because of the capabilities of the microprocessor 310. Many other scales, including an actual voltage measurement may also function depending on the capabilities of the microprocessor 310. Because of these possible differences in measurement value scales, the term "level value" will be used throughout to describe the value assigned to a particular voltage input to the microprocessor 310 for further processing. Further, as mentioned above, the non-linear amplifier 380 may not be needed if the microprocessor 310 used includes greater resolution capacities than the in the present embodiment.

The operation and control of the upstream section 105 will now be described in detail with reference to a flow chart shown in FIG. 14. As mentioned above, the upstream bandwidth conditioning device 100 may intentionally attenuate the upstream bandwidth knowing that most premise devices will automatically increase their output level to counteract the effect of the any added attenuation. Accordingly, with each amount of added attenuation, the signal-to-noise ratio of the upstream bandwidth increases because the noise is attenuated and the premise device has increased its output of desirable frequencies. The limit of this increase in signal-to-noise ratio is the amount of increase in the desirable upstream bandwidth that can be added by the premise device. Accordingly, the level of the upstream bandwidth must be checked and monitored to ensure that the amount of added attenuation does not continually exceed the amount of additional output possible by the premise device.

Figure 14:
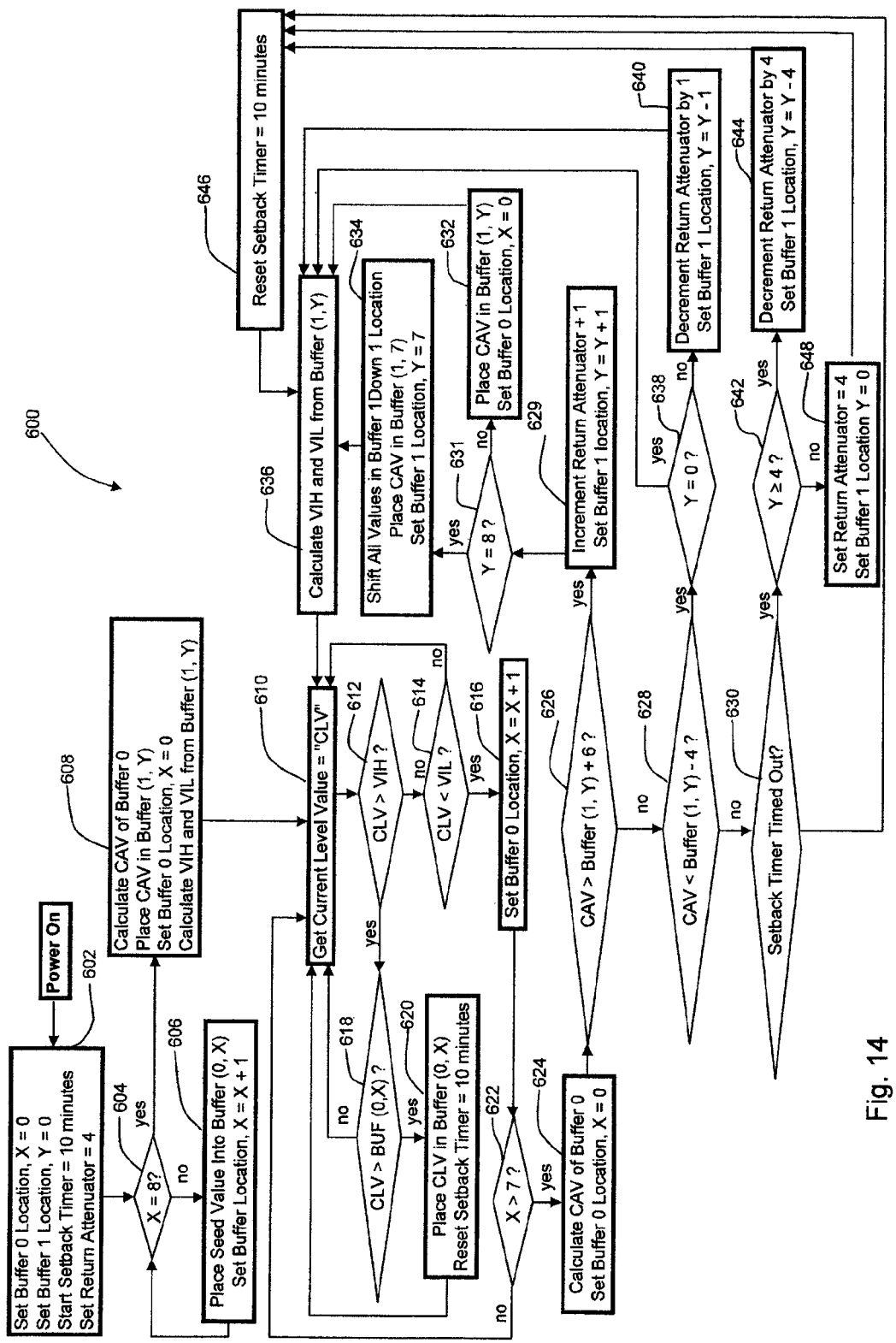
FIG. 14 is a flow chart representing a signal level measurement routine performed by a microprocessor used in a conditioning device made in accordance with one embodiment of the present invention.

Referring now to FIG. 14, the microprocessor 310 works through a series of process steps 600 to determine a level value of the desirable upstream bandwidth generated by a premise device. As part of this determination, the microprocessor utilizes two buffers, a Buffer Ø and a Buffer 1.

The Buffer Ø has eight input locations (Ø-7) in the present embodiment. In the process 600, the Buffer Ø input locations, may be referred to in two separate manners. First, the Buffer Ø input locations may be referred to specifically as Buffer (Ø, Ø), Buffer (Ø, 1), Buffer (Ø, 2), Buffer (Ø, 3), Buffer (Ø, 4), Buffer (Ø, 5), Buffer (Ø, 6), and Buffer (Ø, 7). Second, the Buffer Ø input locations may be referred to as Buffer (Ø, X), where X is a variable that is increased and reset as part of the process 600. The average of the Buffer Ø input locations is referred to herein as the current average value ("CAV").

The Buffer 1 has eight input locations (Ø-7) in the present embodiment. In the process 600, the Buffer 1 input locations may be referred to specifically as Buffer (1, Ø), Buffer (1, 1), Buffer (1, 2), Buffer (1, 3), Buffer (1, 4), Buffer (1, 5), and Buffer (1, 6) and Buffer (1, 7). Further, the Buffer 1 Input Location may be referred to as Buffer (Ø, Y), where Y is a variable that is increased, decreased, and reset as part of the process 600.

Each of the Buffer Ø and the Buffer 1 may include more or less than eight input locations. While it has been found that eight input location works well for the intended purpose of obtaining a level of the upstream bandwidth, more input locations may provide a smoother level value with less volatility. The additional input locations come at a cost of additional time to obtain a level measurement and additional processor consumption.

Upon a powering on of the upstream bandwidth conditioning device 100, the microprocessor 310 performs an initialization routine, which includes steps 602, 604, 606, and 608. According to step 602, the Buffer Ø input location X is set to Ø, and the Buffer 1 input location Y is set to Ø.

Further according to step 602, the microprocessor 310 starts a setback timer, which is set to run for ten minutes in the present embodiment. As will become more apparent during the following description, this ten minute timer is intended to release attenuation placed on the upstream bandwidth when there is no activity from a premise device sensed for the ten minutes. The term "activity" is used here to describe the presence of a CLV that is above VIH. The time of ten minutes may be shorter or longer depending on the experience of users on a particular CATV network. The ten minute time was chosen for the present embodiment in light of an assumption that most people using the internet, VOIP, and/or STB/STU will perform at least one function within a ten minute span. It is assumed that time spans longer than ten minutes typically mean that no user is currently utilizing the internet, VOIP, and/or STB/STU.

Further according to step 602, the return attenuator 320 (FIG. 3) is set to 4 dB of attenuation. This amount of attenuation is the base attenuation provided by the present embodiment of the upstream bandwidth conditioning device 100. This base amount of attenuation may be increased or decreased based on the experience of a particular CATV system. This base amount of 4 dB was chosen because it offered some amount of beneficial noise reduction, but it was low enough to not interfere with any tested premise device, when that premise device was initially turned on and was functioning normally.

According to step 604, the microprocessor 310 checks to see whether the Buffer Ø input location X is equal to 8. The purpose of step 604 is to determine whether Buffer Ø is full. The value of 8 is used, because X is incremented by one after a seed value (discussed below) is placed in the last buffer location (i.e. Buffer (Ø, 7)). Accordingly, even though there is no location "8," the value of eight is relevant to the present determination. It should be understood that a value of "7" could also be used if the step of incrementing the value of "X" occurs at a different location in the process 500. If the answer to step 604 is "no," the microprocessor 310 moves to step 606. Otherwise, the microprocessor 310 moves to step 608.

According to step 606, the microprocessor 310 places a seed value into Buffer (Ø, X), which in the first instance is Buffer (Ø, Ø). The seed value is an empirically derived value that is relatively close to the level value anticipated to be found. In other words, the seed value in the present embodiment is experimentally determined based on actual values observed in a particular CATV system. The seed value needs to be relatively close to the initial level value of the upstream bandwidth to allow the upstream bandwidth conditioning device 100 to start a stabilization process. After filling Buffer (Ø, X) with the seed value, the microprocessor returns to step 604 to check whether Buffer Ø is full. This process between steps 604 and 606 continues to fill all of the Buffer Ø input locations with the seed value. Once full, the microprocessor moves to step 608.

According to step 608, the microprocessor 310 is to obtain a CAV of the Buffer Ø, and place that value in Buffer (1, Y), which in this first instance is Buffer (1, Ø). The microprocessor resets the Buffer Ø input location X to Ø, but leaves the seed values in the Buffer Ø input locations. One skilled in the art would understand that the present process will function normally if the values in Buffer Ø are erased or left as is to be written over at a later time.

Further in accordance with step 608, a high voltage limit ("VIH") and a low voltage limit ("VIL") are calculated based on the CAV value placed into Buffer (1, Y), which is currently Buffer (1, Ø). Note that this could also be worded as calculating VIH and VIL based on the CAV. Regardless, VIH and VIL are calculated values that are used in later steps to exclude a vast majority of level values that are not near the expected level values. This exclusion helps to make the present upstream bandwidth conditioning device 100 more stable by avoiding mistaken peak value measurements that are far below the expected values. Because both VIH and VIL are determined after every new CAV is determined, VIH and VIL are allowed to float in the event of a large change in the level values received. In the present instance, VIH is to be approximately 94% of the Buffer (1, Y), and VIL is to be approximately 81% of the Buffer (1, Y). Both VIH and VIL may be other ratios that allow for more or less level values to be included in any peak value determination. The peak value determination will be discussed further below, but it may be helpful to explain here that VIH sets a high initial threshold where level values below VIH are excluded from consideration. Similarly, VIL is a low secondary threshold where level values are considered until a level value of a particular series (a series starting when a level value exceeds VIH) is below VIL. In other words, a series of level values will be examined for a single peak value, the series beginning with a level value exceeding VIH and ending with a level value falling below VIL. Because the most recent CAV is the seed value of 51, VIH is calculated to be 48 and VIL is calculated to be 41. These values will, of course, change as the CAV changes after actual level values are obtained. After completion of the present step, the microprocessor moves to step 610.

In accordance with step 610, the microprocessor 310 obtains a current level value ("CLV"). The CLV is the value of the voltage provided by the non-linear amplifier 380 (FIG. 3) at the current time. Once a CLV is obtained, the microprocessor proceeds to step 612.

According to step 612, the microprocessor 310 looks to see whether the recently obtained CLV is greater than VIH to start considering a series of level values. As mentioned above, if the particular CLV is the first obtained value (since having a value fall below VIL) that is greater than VIH, it is the first of a series. Accordingly, if the CLV is below VIH, the microprocessor 310 proceeds to step 614 to determine whether CLV is less than VIL, which if true would stop the series. If the CLV is greater than VIH, the next step is step 618.

According to step 614, the microprocessor 310 looks to see whether the recently obtained CLV is less than VIL. As mentioned above, all of the level values obtained that fall below VIL are eliminated from consideration. The process 600 moves to step 616 when the CLV is less than VIL. Accordingly, if the CLV is greater than VIL, the next step is back to step 610 to obtain a new CLV to continue the series started by having a CLV greater than VIH. It should be understood that any of these comparisons to VIH and VIL may be equal to or less/greater than instead of merely less/greater than. The additional values used or not used would not significantly alter the result.

Once the microprocessor 310 proceeds through step 616 a sufficient number of times incrementing the Buffer Ø input location X, step 622 will be satisfied indicating that the Buffer Ø is ready to be averaged. Accordingly, once step 622 is satisfied the microprocessor 310 moves to step 624.

In accordance with step 624, the microprocessor 310 calculates a CAV, which is the average of Buffer Ø, and sets the Buffer Ø input location X to Ø. The microprocessor 310 then proceeds to step 626.

In accordance with step 626, the microprocessor determines whether CAV is greater than the value of Buffer (1, Y)+6. To add clarity to this step, if Buffer (1, Y) is 51, the microprocessor is determining whether the CAV is greater than 51+6, or 57. This value of "6" added to the Buffer (1, Y) value adds stability to the process 600, in that the CAV must be sufficiently high in order to add additional attenuation in step 629. Accordingly, a larger value than "6" may be used to add greater stability at the risk of reducing accuracy. Similarly, a value less than "6" may be used to add greater accuracy at the risk of reducing stability. The microprocessor 310 moves to step 629 to add attenuation if step 626 is answered in the affirmative. Otherwise, the microprocessor 310 moves to step 628.

In accordance with step 629, the microprocessor 310 adds an additional step of attenuation, which in the present embodiment is 1 dB. Additionally, the microprocessor increments the Buffer 1 input location Y in preparation for placing the CAV into Buffer 1. Afterward, the microprocessor moves to step 631.

In accordance with step 631, the microprocessor 310 determines whether the Buffer 1 input locations are full. Because there are only eight input locations in Buffer 1, (Ø-7) a value of 8 would indicate that the Buffer 1 is full. The reason for this will become evident below. If the Buffer 1 is full, the next step is step 634. Otherwise, the next is step 632.

In accordance with step 632, the CAV is placed in the next open Buffer 1 input location, Buffer (1, Y). The process then proceeds to step 636.

If the Buffer 1 were full, the microprocessor 310 would have proceeded to step 634 instead of step 632. In accordance with step 634, all if the values currently in Buffer 1 are shifted down 1 location such that the value originally (i.e., before step 634) in Buffer (1, Ø) is removed from Buffer 1. The CAV is then placed in Buffer (1, 7). Further in step 634, the Buffer 1 input location Y is set to 7. As with step 632, the process 600 proceeds to step 636.

In accordance with 636, the microprocessor 310 calculates a new values for VIH and VIL from Buffer (1, Y), which may be Buffer (1, 7) if step 364 was previously accomplished. After step 636, the process 600 returns to step 610 to obtain a new CLV and the relevant portions of process 600 are reiterated.

Referring now back to step 628, the microprocessor 310 determines whether the CAV is less than the value in Buffer (1, Y)−4. Using a value for Buffer (1, Y) of 51, the microprocessor would be determining whether CAV is less than 51−5, or 47. In this example, the process 600 will move to step 630. Otherwise, the process 600 will move to step 638, which will be discussed later.

In accordance with step 630, the microprocessor determines whether the setback timer has timed out. If the answer is no, the microprocessor 310 proceed to step 646 where the setback timer is reset. Otherwise, the microprocessor 310 moves to step 642.

In accordance with step 642, the microprocessor 310 looks to see whether the Buffer 1 input location Y is greater than or equal to 4. If so, the microprocessor 310 moves to step 644 where the amount of attenuation applied by the variable attenuator 320 is reduced by 4, and the Buffer 1 input location Y is reduced by 4. A value other than "4" may be used if more or less of an attenuation reduction is desired based on time. The value of 4 has been found to be a suitable tradeoff between applying enough reduction in attenuation to ease any additional loads on the premise devices and reacting too quickly to the non-use of premise devices. Afterward, the microprocessor 310 moves to step 646 where the setback timer is reset.

Referring back to step 648, if Y was not greater than or equal to 5 in step 642, the amount of attenuation applied by the variable attenuator 320 will be reduced to the base amount of 4 set in step 602, and the Buffer 1 input location Y will be set to Ø. Afterward, the microprocessor 310 moves to step 646 where the setback timer is reset.

Referring back to step 638, if the microprocessor determined that Buffer 1 input location Y is Ø, the microprocessor moves directly to step 636 to calculate a new VIH an VIL. Otherwise, it is apparent that the variable attenuator 320 may be reduced in step 640 by one step, which in the present embodiment is 1 dB. Also in step 640, the Buffer 1 input location Y is reduced by one. Afterward, the microprocessor moves to step 636.

Step 636 is the final step in the process 600 before the process 600 is restarted, absent the initialization process, at step 610. The microprocessor 310 may continuously proceed through process 600 as processing time allows.

Referring now back to FIG. 3, the amount of attenuation determined by the process 600 is added and reduced using a variable attenuator 320, which is controlled by the microprocessor 310. Based on the present disclosure, it should be understood by one skilled in the art that there are a variety of different hardware configurations that would offer variable attenuation. For example, an embodiment of the upstream bandwidth conditioning device 100 could include a fixed attenuator and a variable amplifier, which is connected and controlled by the microprocessor 310. Other embodiments are envisioned that include both a variable amplifier and a variable attenuator. Further, the variable signal level adjustment device could also be an automatic gain control circuit ("AGC") and function well in the current device. In other words, it should also be understood that the amount of signal level adjustment and any incremental amount of additional signal level adjustment can be accomplished through any of a wide variety of amplification and/or attenuation devices.

In light of the forgoing, the term "variable signal level adjustment device" used herein should be understood to include not only a variable attenuation device, but also circuits containing a variable amplifier, AGC circuits, other variable amplifier/attenuation circuits, and related optical circuits that can be used to reduce the signal strength on the upstream bandwidth.

Figure 15:
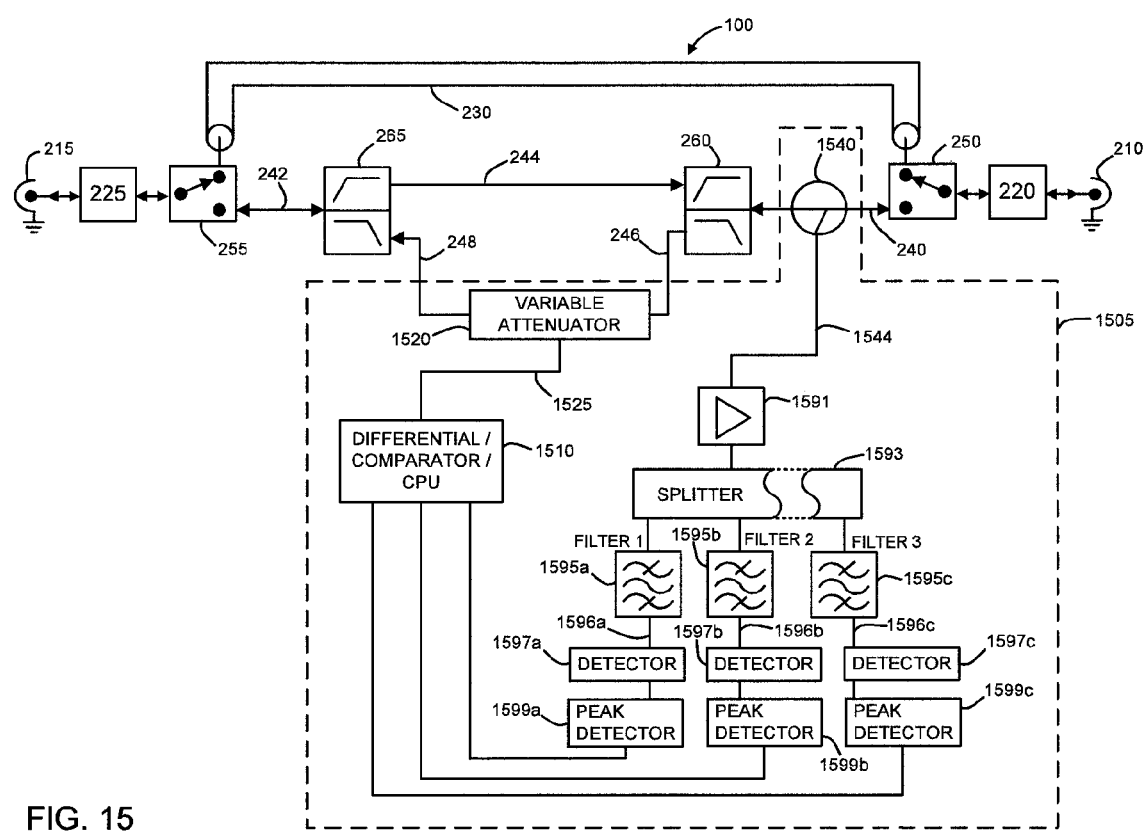
FIG. 15 is a circuit diagram representing a conditioning device including an upstream section in accordance with yet another embodiment of the present invention.

Referring now to FIG. 15, the description of the upstream bandwidth conditioning device 100 will be described for another embodiment of an upstream bandwidth conditioning section 1505 ("upstream section 1505"). The general components of the upstream bandwidth conditioning device 100 were described earlier with reference to FIG. 3, and the hardware, the operation, and the control of the upstream section 1505 will now be discussed with reference to FIG. 15.

It should be understood that the goal of placing the upstream section 1505 into the upstream signal conditioning device 100 at one of the locations described above is to increase the overall quality of the upstream bandwidth in the main distribution system 30 by increasing the carrier-to-noise ratio (e.g., signal-to-noise ratio) of the upstream bandwidth leaving the user's premise before that particular user's upstream bandwidth is merged with those of other users. The upstream section 1505 can access the upstream bandwidth, for example, passing along at least the user side main path 240, and the return path 246, 248 between the diplexers 260, 265.

The upstream section 1505 selectively attenuates the upstream bandwidth in increments with the knowledge that a typical premise device will increase the power with which it transmits its portion of the upstream bandwidth (e.g., the desirable upstream bandwidth) to account for the added attenuation. The result is that the desirable upstream bandwidth will be larger in percentage than the remaining portions (e.g., the undesirable upstream bandwidth). To accomplish these goals, the upstream section 1505 must be able to measure the level of the noise floor and the level of the desirable upstream bandwidth in order to set a desired carrier-to-noise ratio (CNR) for the return path (e.g., the desirable upstream bandwidth), to increase a CNR and/or increase the amount of attenuation without adding more attenuation than the premise device can account for in terms of increasing its output power. In one embodiment, a data compression type for the return path can be set in coordination with the CNR (e.g., controllable CNR) of the return path.

The premise device 100 preferably includes circuit components comprising an embodiment of upstream bandwidth conditioning section. As shown in FIG. 15, the upstream section 1505 can include a coupler 1540, an amplifier 1591, a splitter 1593, a plurality of filters 1595a, 1595b, 1595c (e.g., passive, fixed filters) passing different portions or frequency bands of the upstream bandwidth, a plurality of power detectors 1597a, 1597b, 1597c, a plurality of peak detectors 1597a, 1597b, 1597c and microprocessor 1510. The upstream section 1505 can further include a variable attenuator 1520.

At a simplistic level, the upstream section 1505 can compare desired or selected signals of the upstream bandwidth to the unwanted noise level coming from the user side (e.g., home, user premise) and adjust a variable attenuator to reduce or adjust signal levels in the upstream bandwidth (e.g., return band) by a set number (e.g., 15 dB-40 dB), which can be implemented in attenuation increments, based on a current CNR level. The return path signals feed into a directional coupler that taps off some of the signal (e.g., the coupled upstream bandwidth) while allowing the majority of the return path signals to pass. The coupled upstream bandwidth can be amplified and then the coupled upstream bandwidth can be separated into different portions. Detector circuits can convert the corresponding RF energy from the different bands to DC voltage levels that are held by peak detectors for a sufficient time to allow the microprocessor to measure the DC voltage levels. The microprocessor can apply a voltage level or signal to the adjustable attenuator, based on a ratio of the different power levels in the different portions of the coupled upstream bandwidth, and/or desired upstream signal-to-noise ratio.

The upstream section 1505 separates at least two different portions (e.g., desired signal, noise) of the upstream bandwidth, compares observed power levels detected in the two different portions to a selected respective corresponding reference ratio (e.g., reference CNR), and determines an adjustment or a compensating voltage measurement, if needed, for use at the variable attenuator 1520. Further, the upstream section 1505 can create a premise return path bandwidth 248 having a desired separation between desired signal strength levels and noise floor signal strength levels or desired CNR for transmitted desired signals in or across the upstream bandwidth.

The upstream section 1505 includes a coupler 1540 connected within the user side main path 240 to pass a portion of the upstream bandwidth, in terms of power and/or frequency range, to subsequent devices in the upstream section 1505 via secondary path 1544 proceeding from a coupler output (FIG. 15). One skilled in the art would readily understand, based on the present description and the size requirement of a particular installation, which type of coupler would be suitable for the present purpose.

Signals tapped by the directional coupler 1540 will be referred to herein as the coupled upstream bandwidth. The coupled upstream bandwidth is provided to a first bandpass filter 1595*a*, a second bandpass filter 1595*b*, a third bandpass filter 1595*c* via the amplifier 1591 and the splitter 1593. The coupled upstream bandwidth duplicated and provided to the filters 1595 can have a reduced amplitude or power level. If desirable, amplifier 1591 can increase an amplitude or power level of the coupled upstream bandwidth provided to the splitter 1593.

In one embodiment, the first filter 1595*a* can pass a first frequency band up to 5 MHz or a frequency band below the return path bandwidth set by the user side diplexer 260 and the supplier side diplexer 265 of the premise return path bandwidth. The second filter 1595*b* can pass a frequency band such as but not limited to 5-42 MHz, a subset of 5-42 MHz, 32-36 MHz, or all or a portion of the premise return path bandwidth. The third filter 1595*c* can pass a frequency band between the premise return path bandwidth and the downstream bandwidth set by the user side diplexer 260 and the supplier side diplexer 265 of the coupled bandwidth. Alternatively, the third filter 1595*c* can pass a frequency band such as 42-55 MHz or 85-108 MHz. Further, the filters 1595*a*, 1595*b*, 1595*c* can pass a portion or subset of the exemplary bandwidths described. In one embodiment, the coupled upstream bandwidth is provided to a signal measurement circuit. In one embodiment, the filters 1595*a*, 1595*b*, 1595*c* can pass have a different bandwidth (e.g., different, smaller, larger) than each other. Different size bandwidths can depend on filter crossover or bandgap configurations. In one embodiment, since the power detector 1597*a*, 1597*b*, 1597*c* detect a peak power level in passed signals 1596*a*, 1596*b*, 1596*c*, the passed signals can represent different sized bandwidths for comparison. Alternatively, such exemplary different bandwidth sizes can be compensated, for example, by controlling a reference voltage or using a scaling function. In at least one embodiment of the application, the signals 1596*a*, 1596*b*, 1596*c* do not overlap.

In one embodiment, desired signals in the upstream bandwidth can be respectively passed by filter 1595*b*. The desired signals in the upstream bandwidth can be one or more channels (e.g., each channel including a plurality of carriers in a bandwidth of 6 MHz), a prescribed bandwidth (e.g., 32-36 MHz), or a prescribed percentage of the upstream bandwidth. In one embodiment, each channel is a TV channel. In one embodiment, a noise floor bandwidth passed by filters 1595*a*, 1595*c* can be a prescribed bandwidth outside the bandwidth passed between diplexers 260, 265. In one embodiment, the noise floor band portion is 42 MHz-55 MHz (or 0-5 MHz), which can be monitored in the main return path 240, 242 respectively.

Power detectors 1597*a*, 1597*b*, 1597*c* respectively receive the first, second, and third band signals 1596*a*, 1596*b*, 1596*c*. The power detectors 1597*a*, 1597*b*, 1597*c* can convert received energy to a DC voltage. In one embodiment, the signals 1596*a*, 1596*b*, 1596*c* can be RF signals and the power detectors 1597*a*, 1597*b*, 1597*c* can convert the RF energy in the passed RF signals to a DC voltage. Any of the high quality, commercially available power detector devices will function well within the specified locations within the upstream section 1505.

The peak detectors 1599*a*, 1599*b*, 1599*c* operate to hold the voltage detected by the voltage detectors 1597*a*, 1597*b*, 1597*c* for a sufficient time for the microprocessor 1510. In one embodiment, the peak detectors 1599*a*, 1599*b*, 1599*c* can operate to hold a voltage for at least 0.5 seconds, 1 second, 5 seconds, or 10 seconds. A hold time for the peak detectors 1599 can be set responsive to a specific installed microprocessor or capabilities of the microprocessor 1510. For example, appropriately sized capacitors in the peak detectors 1599*a*, 1599*b*, 1599*c* can operate to hold detected voltages and a resistor (e.g., connected to ground) or the like can operate to drain a voltage from the peak detectors 1599*a*, 1599*b*, 1599*c* over time rather than to maintain a particular voltage indefinitely in the peak detectors 1599*a*, 1599*b*, 1599*c*.

Referring again to FIG. 15, the microprocessor 1510 may be electrically connected downstream from the peak detectors 1599*a*, 1599*b*, 1599*c*. The microprocessor 1510 can receive the voltages from the peak detectors 1599*a*, 1599*b*, 1599*c*. The microprocessor 1510 can be used to compare the difference between two signals from the peak detectors, two voltages, or the ratio of the two voltages to determine a compensation signal 1525 (e.g., that could be used to set and/or adjust the variable attenuator 1520). The microprocessor 1510 measures the individual voltages from the peak detectors 1599*a*, 1599*b*, 1599*c* and may use these actual analog voltage measurements or convert these voltages into digital values using an exemplary digital scale (e.g., a digital scale of 0-255). It should be understood that a scale of 0-255 was chosen in one embodiment only because of the capabilities of the microprocessor 1510. The microprocessor 1510 can determine a current ratio (e.g., current CNR) using at least the value from the peak detector 1599*b* and a value from at least one of the peak detectors 1599*a*, 1599*c*. A current CNR can be compared to the desired ratio (e.g., desired CNR) and an adjustment value or signal 1525 can be sent to the variable attenuator 1520. In one embodiment, the microprocessor 1510 can determine the adjustment value 1525 using the current ratio, the desired ratio, and a look-up table.

In one embodiment, the variable attenuator 1520 can apply a linear signal adjustment (e.g., attenuation) to the return path bandwidth 248. Alternatively, the variable attenuator 1520 can apply a non-linear signal adjustment to the return path bandwidth 248.

Figure 16:
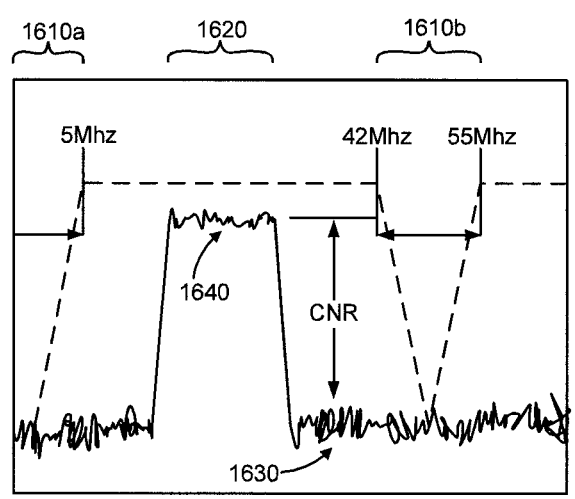
FIG. 16 is a diagram showing exemplary locations in the upstream bandwidth for detection of a noise floor in a return path of a conditioning device.

Referring to FIG. 16, exemplary locations on the transmitted bandwidth of the coupled upstream bandwidth are illustrated for detection of the noise floor. Neither the downstream path nor the return path (e.g., downstream or upstream bandwidths) uses frequencies below 5 MHz or between 42 Mhz to 55 Mhz to transmit signals. For example, the 42 Mhz to 55 Mhz frequency band is the gap between upstream and downstream signals transmitted between the supplier 20 and the user's premise distribution system 130 (e.g., user side connector 210 and supplier side connector 215), which can be specifically set by diplexers 260, 265.

As shown in FIG. 16, exemplary frequency bands 1610*a*, 1610*b* in the upstream bandwidth can be used for noise floor detection. An exemplary frequency band 1620 can be used for carrier level detection. Exemplary carrier signal level 1640 and an exemplary noise floor level 1630 are also shown in FIG. 16.

It is known to one of average skill in the art that certain Carrier-to-Noise Ratios (CNR) need to be met in order to achieve a corresponding prescribed compression type and/or compression rate. Accordingly, selected CNRs can be set to satisfy or implement various compression techniques. According to embodiments of systems and/or methods of the application, once the noise floor is determined (e.g., in the return path), prescribed CNRs can be set to satisfy various rates of compression. When there is at least a 12 dB minimum difference or over a 15 dB difference between the carrier signal level (e.g., 1640) and the noise floor level (e.g., 1630), QPSK compression can be used in the return path transmission. When there is at least a 18 dB difference over a 21 dB difference between the carrier and the noise floor, 16 QAM compression rate can be used in the upstream bandwidth transmission. When there is at least a 24 dB difference or over a 27 dB difference between the carrier and the noise floor, 64 QAM compression rate can be used in the return path transmission. When there is at least a 30 dB difference or a greater than 33 dB difference between the carrier and the noise floor, 256 QAM compression rate can be used in the upstream bandwidth transmission.

In one embodiment, the desired difference (e.g., in dB) needed for the selected compression rate can be used to set the desired or selected CNR used by the microprocessor 1510. Embodiments of the upstream section 1505 and methods for same can be activated automatically upon initialization of the premise device 100, and operate continuously to compensate the return path or upstream bandwidth. Alternatively, adjustment by the upstream section 1505 can be performed periodically, repeatedly, intermittently, responsive to a condition, or responsive to an inquiry or operator action.

An embodiment of a method of operating an upstream section of the upstream signal conditioning device according to the application will now be described. The method embodiment shown in FIG. 17, can be implemented with and will be described using a upstream section embodiment shown in FIG. 15, however, the method embodiment is not intended to be limited thereby.

Figure 17:
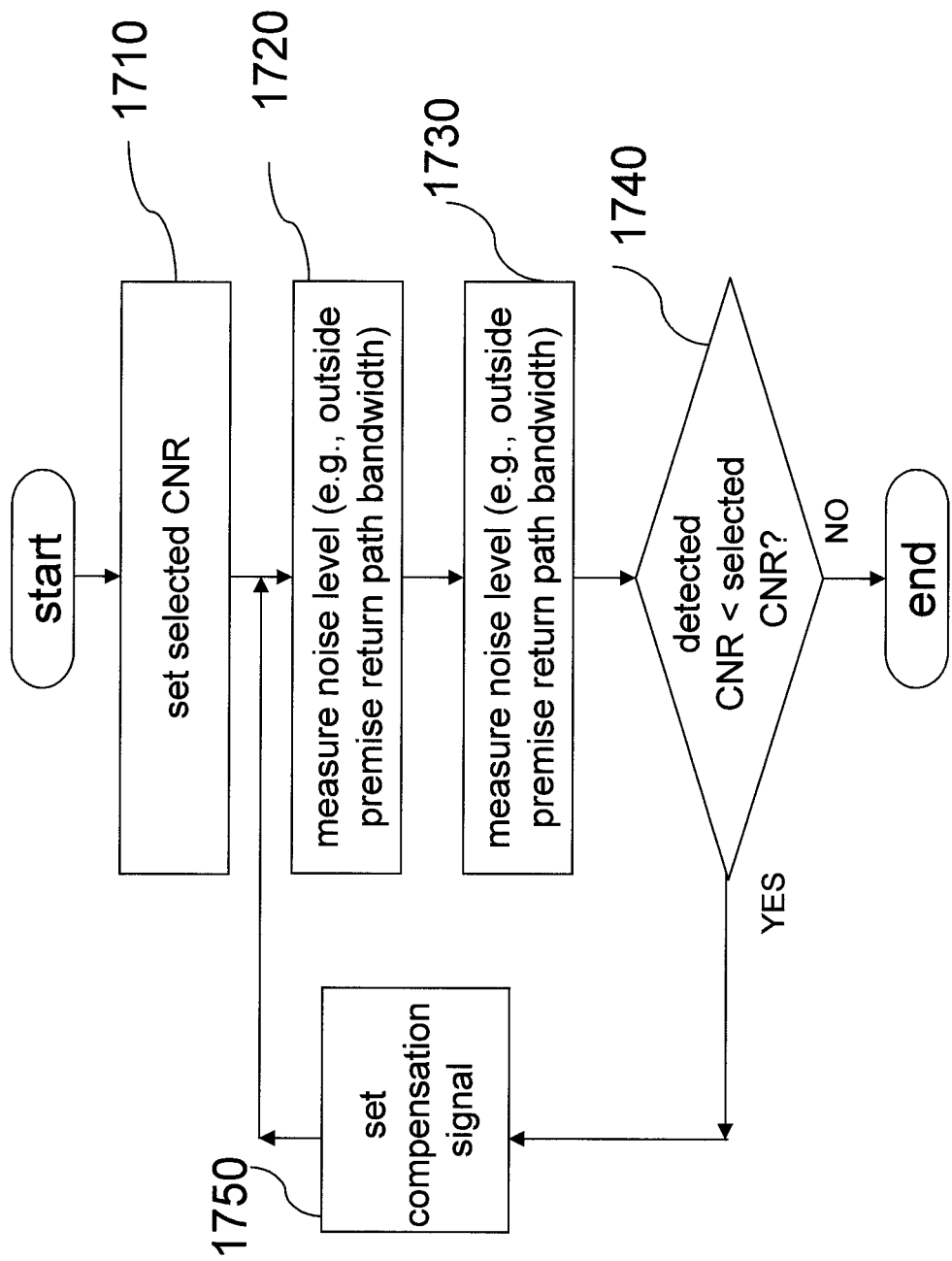
FIG. 17 is a flow chart showing an embodiment of a method for operating conditioning device including an upstream section according to the application.

As shown in FIG. 17, after a process starts, a desired CNR of the upstream bandwidth leaving the user's premise before that particular user's upstream bandwidth is merged with those of other users can be selected (operation block 1710). In one embodiment, a data compression type can be set in coordination with the CNR of the return path.

At least two different portions (e.g., desired signals, noise) of the upstream bandwidth can be selected. The upstream section 1505 can measure the noise floor in a prescribed bandwidth outside the forward and return path bandwidth (e.g., passed between diplexers 260, 265) (operation block 1720).

The upstream section 1505 can measure the carrier signals or desired signals floor in a prescribed bandwidth within the return path bandwidth (e.g., passed between 260, 265) (operation block 1730). For example, the upstream section 1505 can compare desired or selected signals of the upstream bandwidth to the unwanted noise level coming from the user side (e.g., home, user premise) and adjust a variable attenuator to reduce or adjust signal levels in the upstream bandwidth (e.g., return band) by a set number (e.g., 15 dB-40 dB), which can be implemented in attenuation increments, based on a current detected CNR level.

In one embodiment, the desired signal level can be detected in a 32 MHz-33 MHz portion of the upstream bandwidth and the noise floor band portion can be detected in a 42 MHz-55 MHz portion of the upstream bandwidth, which can be monitored in the main return path 240, 242 respectively. For example, the 32 MHz-33 MHz portion or subset thereof can be a small frequency band monitored by the supplier 20 for control signals.

The microprocessor 1510 can be used to compare the difference between the two detected levels (e.g., voltages or the ratio of the two voltages) to determine carrier-to-noise ratios. If the determined carrier-to-noise ratio is less than the selected ratio (operation block 1740), the compensation signal 1525 (e.g., that could be used to set and/or adjust the variable attenuator 1520) can be determined (operation block 1750) and control can return to operation block 1720.

Thus, the current detected CNR can be compared to the desired CNR and an adjustment value or signal 1525 can be sent to the variable attenuator 1520. In one embodiment, the microprocessor 1510 can determine the adjustment value 1525 using the current ratio, the desired ratio, and a look-up table. For example, the look-up table can include values such as but not limited to current noise floor, current signal level, current attenuation level, desired CNR, adjustment value, one or more values for previous noise floor levels, previous signal levels, previous attenuation levels, previous desired CNR, and/or previous adjustment values. Otherwise, when the detected CNR is not less than the selected CNR in operation block 1740, the process can end.

In another embodiment, a low compression rate can be initially implemented, and then the CNR can be increased to a current prescribed or maximum value, which can be used to determine a current prescribed or maximum data compression rate for the upstream section or upstream signal conditioning device.

While the present invention has been particularly shown and described with reference to certain exemplary embodiments, it will be understood by one skilled in the art that various changes in detail may be effected therein without departing from the spirit and scope of the invention as defined by claims that can be supported by the written description and drawings. Further, where exemplary embodiments are described with reference to a certain number of elements it will be understood that the exemplary embodiments can be practiced utilizing either less than or more than the certain number of elements.

The invention claimed is:

1. A device for conditioning an upstream bandwidth, the device comprising:
   a return path extending at least a portion of a distance between a supplier side connector and a user side connector;
   a coupler connected within the return path, wherein the coupler passes a portion of the upstream bandwidth to a secondary path;
   a splitter circuit connected electrically downstream from the coupler;
   a noise floor detector connected electrically downstream from the splitter;
   a level detector connected electrically downstream from the splitter circuit;
   a variable signal level adjustment device connected within the return path electrically downstream from the coupler; and
   a microprocessor connected electrically downstream of the noise floor detector, the microprocessor configured to use the detected noise floor to control the variable signal level adjustment device.

2. The conditioning device of claim 1, wherein the noise floor detector comprises a detector circuit and a first band pass filter passing a signal bandwidth outside a supplier upstream bandwidth and a supplier downstream bandwidth and a detector circuit coupled connected electrically downstream from the first band pass filter.

3. The conditioning device of claim 2, the first band pass filter to pass a signal below 5 MHz, between 42 MHz-55 MHz, or between 85 MHz-108 MHz.

4. The conditioning device of claim 1, wherein the noise floor detector comprises a band pass filter, a detector, and a peak detector coupled in series connected electrically downstream of the coupler.

5. The conditioning device of claim 1 further comprising a level detector connected electrically downstream from the splitter and electrically upstream from the microprocessor, the level detector to provide an upstream information signal level to the microprocessor.

6. The conditioning device of claim 5, wherein the noise floor detector comprises a band pass filter, a detector, and a peak detector coupled in series connected electrically downstream of the coupler.

7. The conditioning device of claim 1, where the microprocessor compares a ratio of a noise floor signal and a carrier signal to set a control signal to the variable signal level adjustment device.

8. The conditioning device of claim 7, where the microprocessor comprises digital circuit components or analog circuit components.

9. The conditioning device of claim 1, the microprocessor to determine selected decibel levels and compression types CNR using a compression rate among a plurality of compression rates according to a difference between levels of the carrier signal and the noise floor signal or a selection CNR.

10. The conditioning device of claim 1, wherein the coupler is connected electrically in a user side main path between a user side diplexer filter and a user side connector.

11. A method for conditioning a downstream bandwidth on a premise of a user of CATV services, the method comprising:
receiving a upstream bandwidth from a user side connector;
passing a portion of the upstream bandwidth through first and second different passive filters to obtain an upstream signal level and at least one offset signal level;
measuring a signal strength of the upstream signal level and a signal strength of the at least one offset signal level;
comparing a ratio of the upstream signal level strength and the at least one offset signal level strength to a first predetermined signal strength ratio to output a first compensation amount;
dividing the upstream bandwidth and the downstream bandwidth from a user side connector; and adjusting the divided upstream bandwidth by a variable amount of signal level adjustment responsive to the first compensation value.

12. The method of claim 11, where a bandwidth for the upstream signal level and a bandwidth for the at least one offset signal level are different size bandwidths, where the at least one offset signal level bandwidth is 42-55 MHz or less than 5 MHz.

13. The method of claim 11, where the first predetermined signal strength ratio corresponds to at least 15 dB difference, at least 21 dB difference, at least 27 dB difference, at least 33 dB difference between upstream signal level strength and the at least one offset signal level strength.

14. The method claim 13, wherein an upstream compression rate uses QPSK, 16 QAM, 64 QAM, 256 QAM according to a level of the first predetermined signal ratio.

15. The method of claim 11, wherein the adjusting the upstream bandwidth is repeatedly performed or continuously performed.

16. The method of claim 11, wherein adjusting the divided upstream bandwidth comprises:
adding an increment of attenuation to the divided upstream bandwidth or;
reducing the increment of attenuation from the divided upstream bandwidth, further comprising reducing the increment of attenuation to the upstream bandwidth when a predetermined time has elapsed since a completion of a previous step of adjusting the divided upstream bandwidth.

17. A device for conditioning an upstream bandwidth, the device comprising:
a return path extending at least a portion of a distance between a supplier side and a user side connector;
a first portion of the return path extending between a user side diplexer filter and a supplier side diplexer filter;
a coupler connected outside the first portion of the return path, the coupler providing a secondary path, wherein the coupler passes a portion of the upstream bandwidth to the secondary path;
a splitter circuit connected electrically downstream the coupler;
an offset level detector connected electrically downstream of the splitter;
a signal level detector connected electrically downstream the splitter circuit;
a microprocessor connected electrically downstream the offset detector and the level detector; and
a variable signal level adjustment device connected within the first portion of the return path electrically downstream from the coupler, the variable signal level adjustment device being controlled by the microprocessor in accordance with an offset level detector outside the first portion of the return path.

18. The conditioning device of claim 17, wherein the offset detector and the signal level detector comprises a band pass filter, a detector, and a peak detector coupled in series connected electrically downstream of the splitter, where the band pass filter for the offset level detector passes a signal bandwidth outside a supplier upstream bandwidth and a supplier downstream bandwidth.

19. The conditioning device of claim 17, where the microprocessor compares a ratio of the offset level and a signal level to change an amount of signal level adjustment for the variable signal level adjustment device.

20. A device for conditioning an upstream bandwidth, the device comprising:
a return path extending at least a portion of a distance between a supplier side connector and a user side connector;
a coupler connected within the return path, wherein the coupler passes a portion of the upstream bandwidth to a secondary path;
a radio frequency detection circuit connected within the secondary path electrically downstream from the coupler;
a level detector connected within the secondary path electrically downstream from the radio frequency detection circuit;
a variable signal level adjustment device connected within the return path electrically downstream from the level detector; and
a microprocessor connected electrically downstream of the radio frequency detection circuit, the microprocessor configured to use a detected noise floor to control the variable signal level adjustment device.

21. The conditioning device of claim 20, wherein the secondary path further comprises a high-pass filter connected within the secondary path downstream from the coupler.

22. The conditioning device of claim 21, wherein the radio-frequency detection circuit comprises:

a radio-frequency amplifier;
a radio-frequency detector; and
a low-pass amplifier.

* * * * *